(12) United States Patent
Soh et al.

(10) Patent No.: US 10,509,613 B2
(45) Date of Patent: Dec. 17, 2019

(54) CONTROL DEVICE FOR VEHICLE

(71) Applicant: LG ELECTRONICS INC., Seoul (KR)

(72) Inventors: Yoonna Soh, Seoul (KR); Donghwa Kim, Seoul (KR); Sungjun Park, Seoul (KR); Iljin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 186 days.

(21) Appl. No.: 15/283,561

(22) Filed: Oct. 3, 2016

(65) Prior Publication Data

US 2017/0322760 A1 Nov. 9, 2017

(30) Foreign Application Priority Data

May 9, 2016 (KR) ........................ 10-2016-0056536

(51) Int. Cl.
*G06F 3/14* (2006.01)
*B60K 37/06* (2006.01)
*B60R 11/02* (2006.01)
*B60R 11/00* (2006.01)
(Continued)

(52) U.S. Cl.
CPC ............ *G06F 3/1431* (2013.01); *B60K 37/06* (2013.01); *B60R 11/0235* (2013.01); *G06F 3/1446* (2013.01); *B60K 2370/182* (2019.05); *B60K 2370/184* (2019.05); *B60K 2370/52* (2019.05); *B60K 2370/774* (2019.05); *B60R 2011/0084* (2013.01); *G06F 3/0488* (2013.01); *G06F 3/04817* (2013.01)

(58) Field of Classification Search
CPC .... G06F 3/1431; B60K 37/06; B60R 11/0235
See application file for complete search history.

(56) References Cited

U.S. PATENT DOCUMENTS 4,908,611 A * 3/1990 Iino .................. B60R 11/02
345/7
6,067,078 A * 5/2000 Hartman ............... B60K 35/00
345/168
(Continued)

FOREIGN PATENT DOCUMENTS

CN 201780112 3/2011
CN 201964893 9/2011
(Continued)

OTHER PUBLICATIONS

Extended European Search Report in European Application No. 16002526.8, dated Jul. 7, 2017, 7 pages (with English translation).

*Primary Examiner* — Nitin Patel
*Assistant Examiner* — Robert M Stone
(74) *Attorney, Agent, or Firm* — Fish & Richardson P.C.

(57) ABSTRACT

A control device for a vehicle equipped in the vehicle, the control device that includes a first display located in a center fascia of the vehicle, a second display located at a lower side of the first display, a guide configured to guide the second display to be moved in a direction from front to rear sides of the vehicle, and a controller configured to control at least one of the first and second displays such that information output on the at least one of the first and second displays differs according to a position of the second display is disclosed.

18 Claims, 27 Drawing Sheets

(51) Int. Cl.
*G06F 3/0481* (2013.01)
*G06F 3/0488* (2013.01)

(56) References Cited

U.S. PATENT DOCUMENTS

| | | | | |
|---|---|---|---|---|
| 6,570,628 B1* | 5/2003 | Hirano | ............... | B60K 35/00 349/11 |
| 6,663,155 B1* | 12/2003 | Malone | ............... | B60R 11/0229 224/539 |
| 8,587,546 B1* | 11/2013 | El-Khoury | ............ | G06F 3/1431 345/173 |
| 8,803,676 B2* | 8/2014 | Sitarski | ............... | G06T 13/80 340/438 |
| 9,316,828 B2* | 4/2016 | Yamada | ............... | B60R 1/00 |
| 9,622,159 B2* | 4/2017 | Buttolo | ............... | B60R 16/037 |
| 2003/0162312 A1* | 8/2003 | Takayama | ......... | H01L 21/76251 438/22 |
| 2006/0109197 A1* | 5/2006 | Kuwabara | ............ | B60K 35/00 345/1.1 |
| 2007/0061068 A1* | 3/2007 | Okamoto | ............... | B60K 35/00 701/532 |
| 2007/0297064 A1* | 12/2007 | Watanabe | ............... | B60K 35/00 359/630 |
| 2008/0010875 A1* | 1/2008 | Kuwabara | ............ | B60R 11/0235 40/424 |
| 2009/0132130 A1* | 5/2009 | Kumon | ............... | B60K 35/00 701/49 |
| 2009/0161302 A1* | 6/2009 | Ferren | ............... | B60K 35/00 361/679.01 |
| 2011/0050975 A1* | 3/2011 | Chung | ............... | G06F 1/1624 348/333.02 |
| 2012/0268665 A1* | 10/2012 | Yetukuri | ............... | B60K 35/00 348/837 |
| 2013/0241720 A1* | 9/2013 | Ricci | ............... | G06F 3/0486 340/425.5 |
| 2014/0145933 A1* | 5/2014 | Chae | ............... | G06F 3/017 345/156 |
| 2014/0320768 A1 | 10/2014 | Hagiwara et al. | | |
| 2015/0002991 A1* | 1/2015 | Vander Sluis | ...... | B60R 11/0235 361/679.01 |
| 2015/0084886 A1* | 3/2015 | Kamiyama | ......... | G06F 3/03548 345/173 |
| 2015/0178034 A1* | 6/2015 | Penilla | ............... | G06Q 20/18 345/1.1 |
| 2016/0062583 A1* | 3/2016 | Ricci | ............... | H04W 4/90 715/746 |
| 2016/0193924 A1* | 7/2016 | Kim | ............... | G06F 1/1601 296/70 |
| 2016/0196800 A1* | 7/2016 | Kim | ............... | G09G 5/14 715/771 |
| 2016/0259365 A1* | 9/2016 | Wang | ............... | B60K 35/00 |
| 2016/0274717 A1* | 9/2016 | Wako | ............... | G06F 3/0488 |
| 2017/0083047 A1* | 3/2017 | Helot | ............... | B60K 37/06 |
| 2017/0153670 A1* | 6/2017 | Kim | ............... | G06F 1/1652 |

FOREIGN PATENT DOCUMENTS

| | | |
|---|---|---|
| EP | 1622112 | 2/2006 |
| EP | 1762419 | 3/2007 |
| EP | 3040230 | 7/2016 |
| JP | 2013220736 | 10/2013 |
| KR | 10-2014-0070798 | 6/2014 |
| KR | 10-2016-0070527 | 6/2016 |
| KR | 10-2016-0083721 | 7/2016 |

* cited by examiner

FIG. 6A
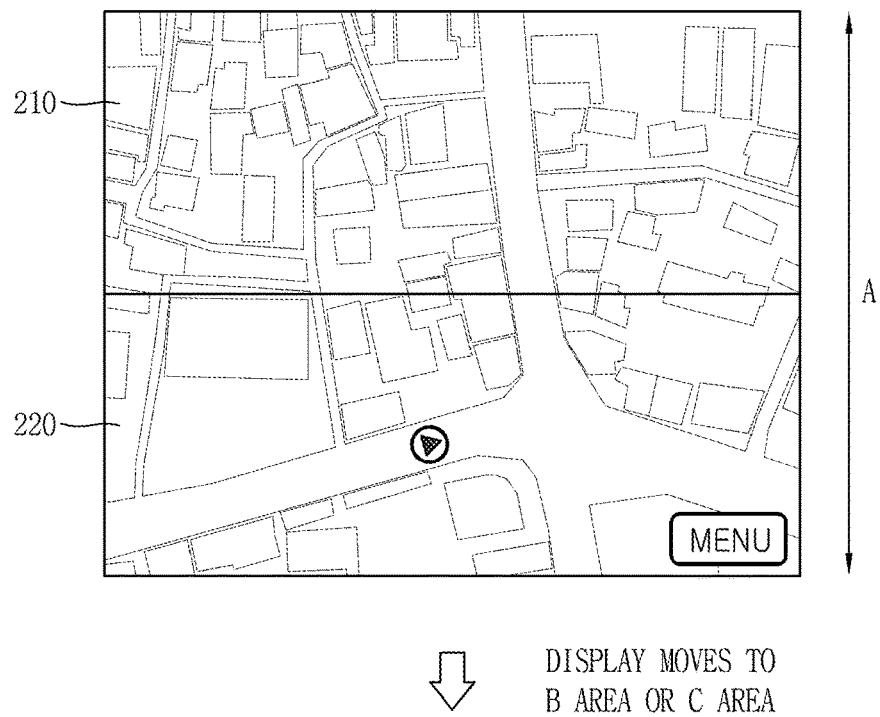
DISPLAY MOVES TO
B AREA OR C AREA
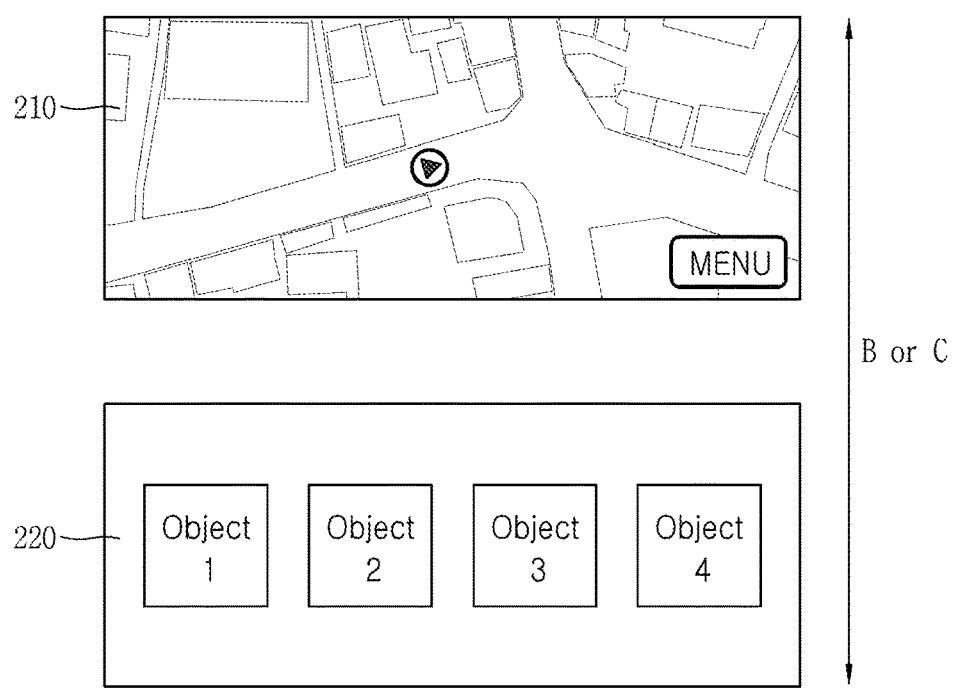

FIG. 6D
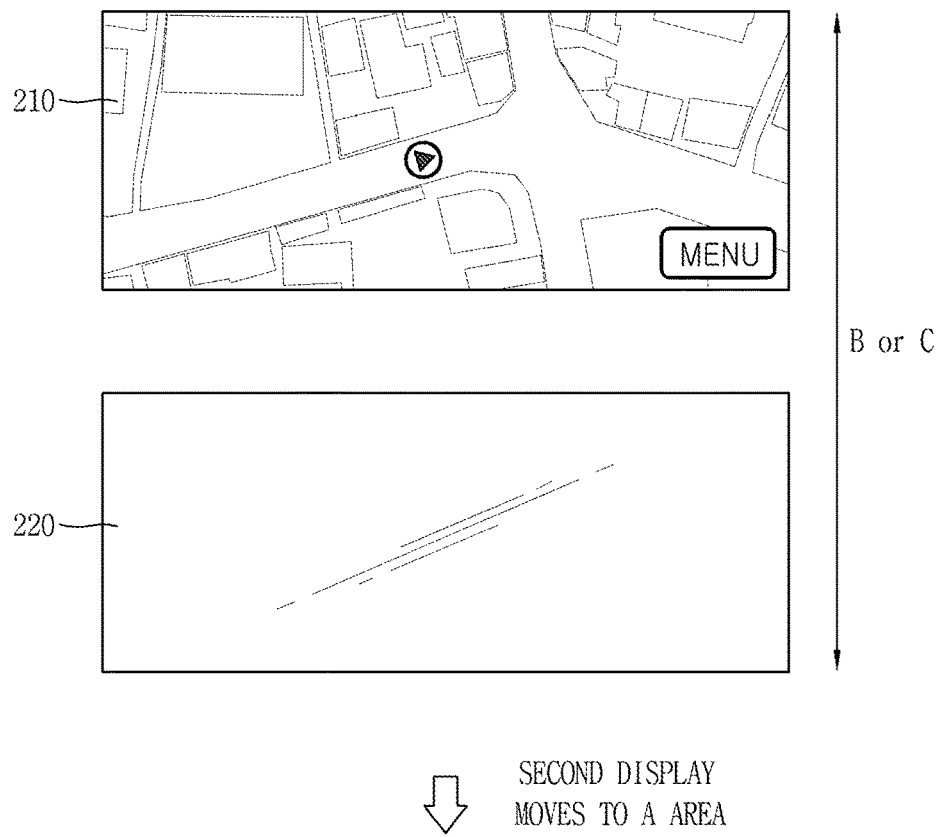
SECOND DISPLAY
MOVES TO A AREA

FIG. 7A
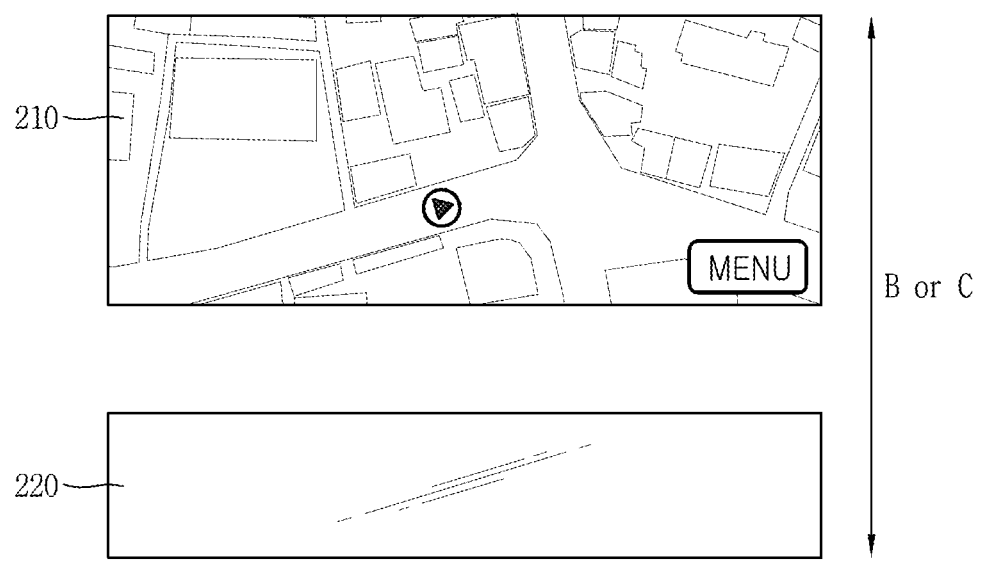

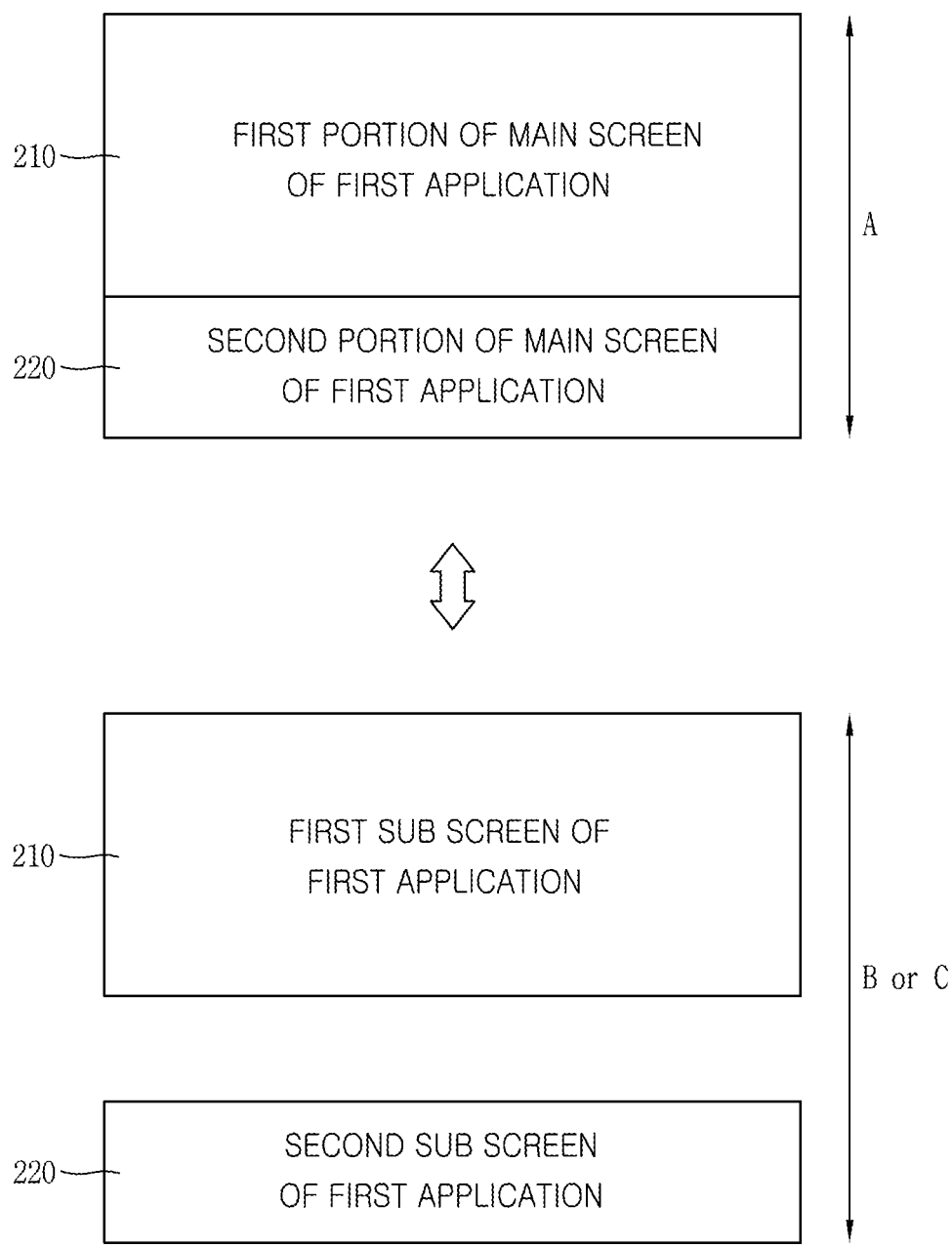

FIG. 10
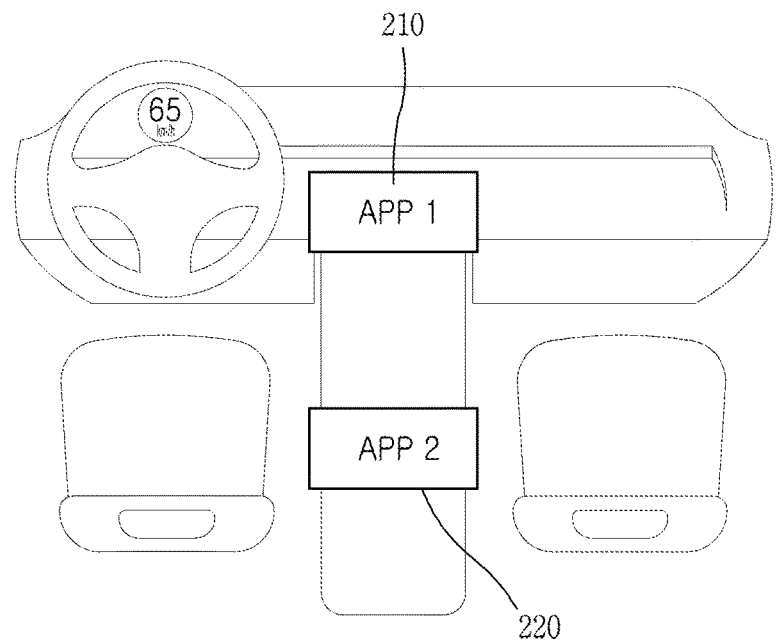
⇩ FIRST DISPLAY IS OUT OF ORDER
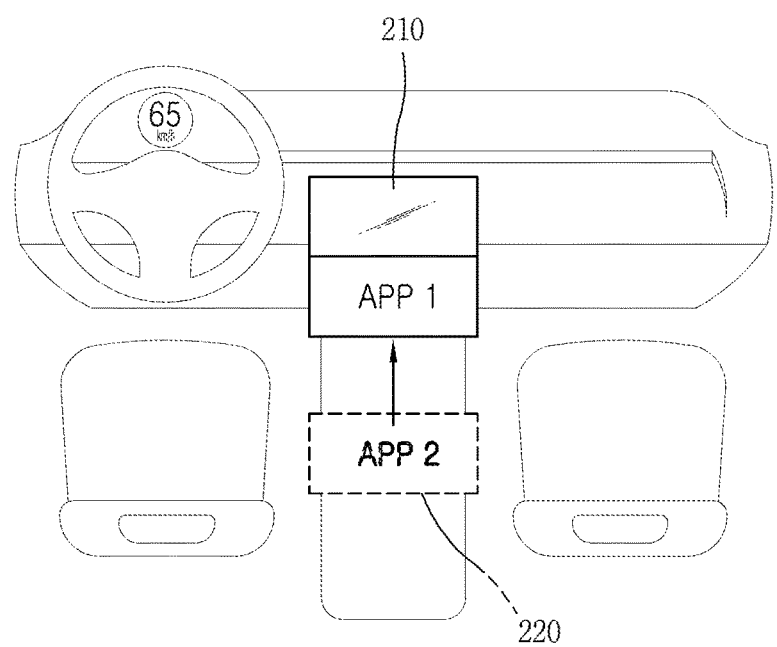

FIG. 15B
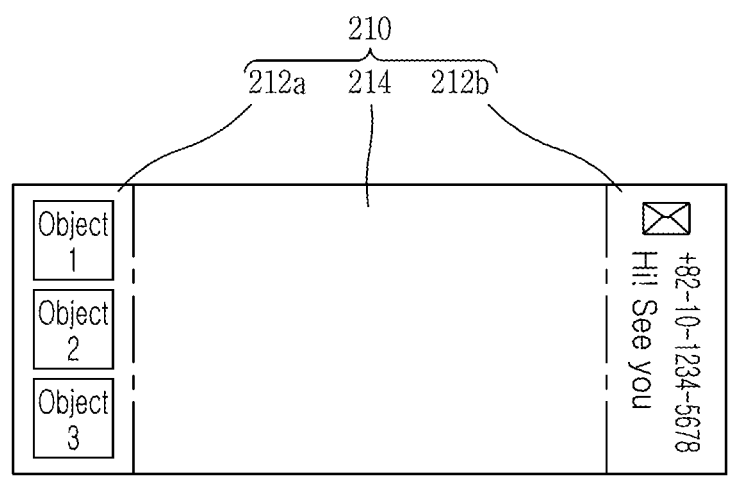
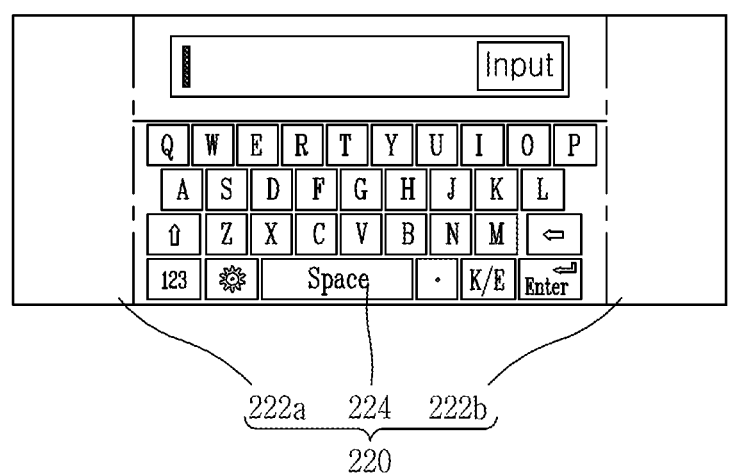

FIG. 16
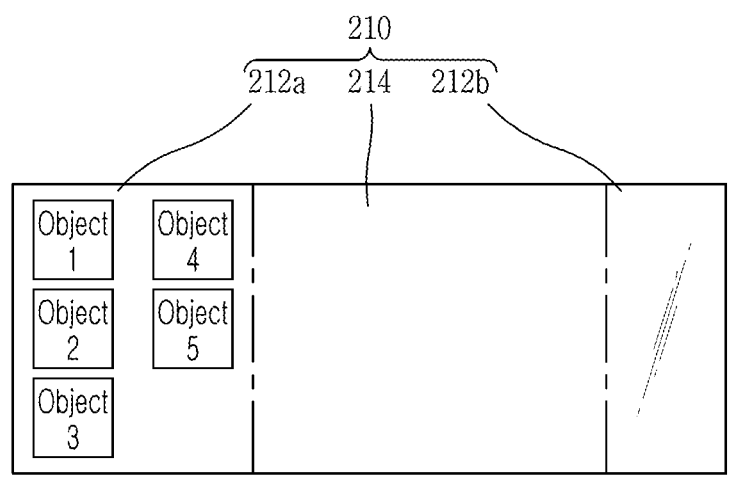
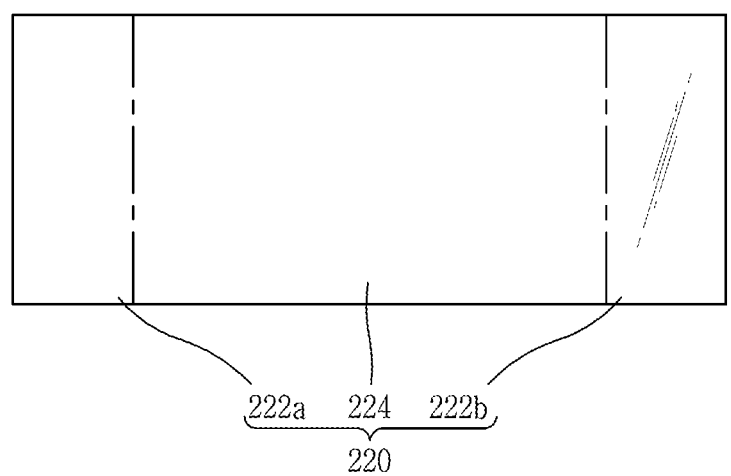

CONTROL DEVICE FOR VEHICLE

CROSS-REFERENCE TO RELATED APPLICATION

Pursuant to 35 U.S.C. § 119(a), this application claims the benefit of an earlier filing date of and the right of priority to Korean Application No. 10-2016-0056536, filed on May 9, 2016, the contents of which are incorporated by reference herein in its entirety.

BACKGROUND OF THE INVENTION

1. Field of the Invention

This specification relates to a control device for a vehicle, which is equipped in the vehicle and provided with a display capable of providing visual information to a person within the vehicle.

2. Background of the Invention

A vehicle is an apparatus capable of carrying or moving people or loads using kinetic energy, and a representative example may be a car.

For safety and convenience of a user using a vehicle, various sensors and devices are equipped in the vehicle and functions of the vehicle are diversified.

The functions of the vehicle may be divided into a convenience function for promoting a driver's convenience, and a safety function for enhancing safety of the driver and/or pedestrians.

First, the convenience function has a development motive associated with the driver's convenience, such as providing infotainment (information+entertainment) to the vehicle, supporting a partially autonomous driving function, or helping the driver ensuring a field of vision at night or at a blind spot. For example, the convenience functions may include various functions, such as an active cruise control (ACC), a smart parking assist system (SPAS), a night vision (NV), a head up display (HUD), an around view monitor (AVM), an adaptive headlight system (AHS), and the like.

The safety function is a technique of ensuring safeties of the driver and/or pedestrians, and may include various functions, such as a lane departure warning system (LDWS), a lane keeping assist system (LKAS), an autonomous emergency braking (AEB), and the like.

Efforts are ongoing to support and increase the functionalities of vehicles. Such efforts include software and hardware improvements, as well as changes and improvements in the structural components.

Owing to the development, various types of displays are equipped in a vehicle, and a control device for a vehicle controls information output on the displays to provide various convenience functions and safety functions to passengers of the vehicle.

Meanwhile, many people can get on a vehicle. The people may be classified into a driver and passengers according to whether or not a person drives the vehicle, and also classified into persons on front seats and persons on rear seats according to positions within the vehicle (based on car).

According to a passenger in a vehicle, information to be provided or not to be provided may be classified. For example, a driver may be provided with information in a range without interfering with driving of the vehicle, while the other passengers may be provided with information without a limit. As another example, a driver should be provided with information required for driving, such as speed, an amount of remaining oil and the like, while the other passengers except for the driver do not have to get such information required for driving.

One solution may be to install an independent display for each passenger in a vehicle. However, since passengers except for a driver do not always get on the vehicle, this solution is inefficient in view of costs. Therefore, development of a control device for a vehicle, which is capable of providing different information to various passengers with the least costs is required.

SUMMARY OF THE INVENTION

Therefore, an aspect of the detailed description is to solve the aforementioned problems and other drawbacks.

Another aspect of the detailed description is to provide a control device for a vehicle, which is mounted on a vehicle and controls various electric components equipped in the vehicle.

Another aspect of the detailed description is to provide a control device for a vehicle, capable of providing various information by controlling displays disposed in the vehicle.

Another aspect of the detailed description is to provide a control device for a vehicle, capable of providing various user interfaces according to passengers.

Another aspect of the detailed description is to provide a control device for a vehicle, capable of providing information specialized for each passenger to a plurality of passengers sitting in different seats within the vehicle.

To achieve these and other advantages and in accordance with the purpose of this specification, as embodied and broadly described herein, there is provided a control device for a vehicle, the device including a first display located in a center fascia of the vehicle, a second display located at a lower side of the first display, a guide configured to guide the second display to be moved in a direction from front to rear sides of the vehicle, and a controller configured to control at least one of the first and second displays such that information output on the at least one of the first and second displays differs according to a position of the second display.

In one exemplary embodiment disclosed herein, the controller may control the first and second displays to output an execution screen of an application in a dividing manner when the first and second displays are in a contact state or spaced apart from each other by a predetermined distance or less. The controller may control the first and second displays such that the execution screen of the application is output on the first display, and preset screen information is output on the second display, when the spaced distance is greater than the predetermined distance while the execution screen of the application is output on the first and second displays in the dividing manner.

In one exemplary embodiment disclosed herein, the preset screen information may differ according to the spaced distance or the position of the second display.

In one exemplary embodiment disclosed herein, the preset screen information may include icons included in a first group when the second display is located within a first range. On the other hand, the preset screen information may include icons included in a second group, other than the icons included in the first group, when the second display is located within a second range different from the first range.

In one exemplary embodiment disclosed herein, electric components installed in the vehicle may be divided into electric components included in a front group and electric components included in a rear group according to arranged positions. The icons included in the first group may be linked with control functions of the electric components included in the front group, respectively, and the icons included in the second group may be linked with control functions of the electric components included in the rear group, respectively.

In one exemplary embodiment disclosed herein, the preset screen information may include a plurality of icons. The controller may execute an application corresponding to one of the plurality of icons when a touch is applied to the one icon while the present screen information is output on the second display, and control the first and second displays such that an execution screen of a first application is output on the first display and an execution screen of a second application is output on the second display.

In one exemplary embodiment disclosed herein, the controller may control the second display such that the execution screen of the second application disappears therefrom and the execution screen of the first application is output thereon, when the spaced distance is within the predetermined distance or the second display is moved to be brought into contact with the first display, while the execution screen of the first application is output on the first display and the execution screen of the second application is output on the second display.

In one exemplary embodiment disclosed herein, the controller may control the second display to be turned off and control the first display to output a cursor corresponding to a touch applied to the second display, when the second display is moved to a preset position while the execution screen of the application is output on the first and second displays in the dividing manner.

In one exemplary embodiment disclosed herein, the controller may control the first and second displays to change information currently output on the first and second displays into another information when a touch input is applied while the first and second displays are in a contact state or spaced apart from each other by a predetermined distance. The controller may control the first and second displays such that information currently output on one of the first and second displays is changed into another information and information currently output on the other is continuously output, when a touch input is applied to the one of the first and second displays while the spaced distance is greater than the predetermined distance.

In one exemplary embodiment disclosed herein, the controller may execute an application based on a user input. The controller may control the first and second displays to output a main execution screen of the application in a dividing manner when the first and second displays are in a contact state or spaced apart from each other by a predetermined distance. The controller may control the first and second displays such that a first sub execution screen of the application is output on the first display and a second sub execution screen of the application is output on the second display when the spaced distance is greater than the predetermined distance.

In one exemplary embodiment disclosed herein, the first display may include a left area facing a left side surface, a front area facing a front surface, and a right area facing a right side surface. The controller may control the first display to output icons included in a first group on the left area and icons included in a second group on the right area.

In one exemplary embodiment disclosed herein, the controller may control the first display not to output the icons included in the second group on the right area when a person is not in a passenger seat of the vehicle. The controller may control the first display to output the icons included in the second group on the right area when a person is in the passenger seat.

In one exemplary embodiment disclosed herein, the control device for the vehicle may further include a sensor configured to detect a position of a light source. The controller may control the first display to switch output positions of information output on the left area and information output on the front area with each other according to the position of the light source.

In one exemplary embodiment disclosed herein, the controller may control the first display to output call reception information on the left area when the call is received in a first terminal located at a driver seat. The controller may control the first display to output call reception information on the right portion when the call is received in a second terminal located at a passenger seat.

In one exemplary embodiment disclosed herein, the first display may be configured to be bendable by external force. The controller may control the first display to output icons included in a first group on at least part thereof, facing a left side surface, when the at least part of the first display is bent toward the left side surface by external force. On the other hand, the controller may control the first display to output icons included in a second group on at least part thereof, facing a right side surface, when the at least part of the first display is bent toward the right side surface by external force.

In one exemplary embodiment disclosed herein, the controller may control the second display to be turned off when a preset touch input is applied to the second display while first screen information is output on the first display and second screen information is output on the second display.

In one exemplary embodiment disclosed herein, when a preset breakdown occurs in one of the first and second displays, the controller may control the one display to be turned off, and control the other not to change information currently output thereon according to the position of the second display.

In one exemplary embodiment disclosed herein, the control device for the vehicle may further include a fixing member configured to fix the second display to the guide to prevent a movement of the second display when the preset breakdown occurs in the one display.

In one exemplary embodiment disclosed herein, the control device for the vehicle may further include a sensor provided on the guide and configured to detect the position of the second display. The controller may control the at least one of the first and second displays such that information output on the at least one is changed based on the position of the second display detected by the sensor.

In one exemplary embodiment disclosed herein, the guide may be located between a driver seat and a passenger seat of the vehicle and has at least part extending from front to rear sides of the vehicle.

A control device for a vehicle and a method for controlling the same according to the present invention will provide the following effects.

According to at least one of embodiments of the present invention, positions of a plurality of displays can vary and output information may differ according to the positions. This may allow a passenger in the vehicle can efficiently use the plurality of displays.

Also, at least one of the plurality of displays may be turned on/off according to a presence or absence of a person sitting in a passenger seat and/or rear seats.

In addition, since at least part of a display is bendable or bent toward a driver seat, the driver can easily check information output on the display during driving. Also, icons linked with control functions for the driver may be output on a left side surface bent toward the driver seat, and icons linked with control functions for a passenger sitting in the seat next to the driver may be output on a right side surface bent toward a passenger seat, which may allow the driver or the passenger in the passenger seat to properly use necessary functions.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 6A to 6D are conceptual views illustrating an operation when first and second displays in a combined (coupled, connected) state are separated from each other;

FIGS. 7A and 7B are views illustrating an embodiment in which a second display operates as a user input unit for applying a user input to a first display;

FIG. 8 is a view illustrating an embodiment in which an execution screen of one application changes according to a connection/separation of first and second displays;

FIG. 10 is a view illustrating an operation when one of first and second displays is out of order;

FIG. 16 is a view illustrating a bendable display with at least part bendable by external force.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A control device for a vehicle described herein is a device for electronically controlling at least one component equipped in the vehicle, and may be an electronic control unit (ECU), for example.

Control devices for a vehicle may be implemented using a variety of different types of terminals. Examples of such terminals include mobile terminals, such as mobile phones, smart phones, notebook computers, digital broadcast terminals, Personal Digital Assistants (PDA), Portable Multimedia Players (PMP), navigators, slate PCs, tablet PCs, ultrabooks, wearable devices, and the like, and stationary terminals, such as digital TVs, desktop computers, digital signage and the like.

Figure 1:
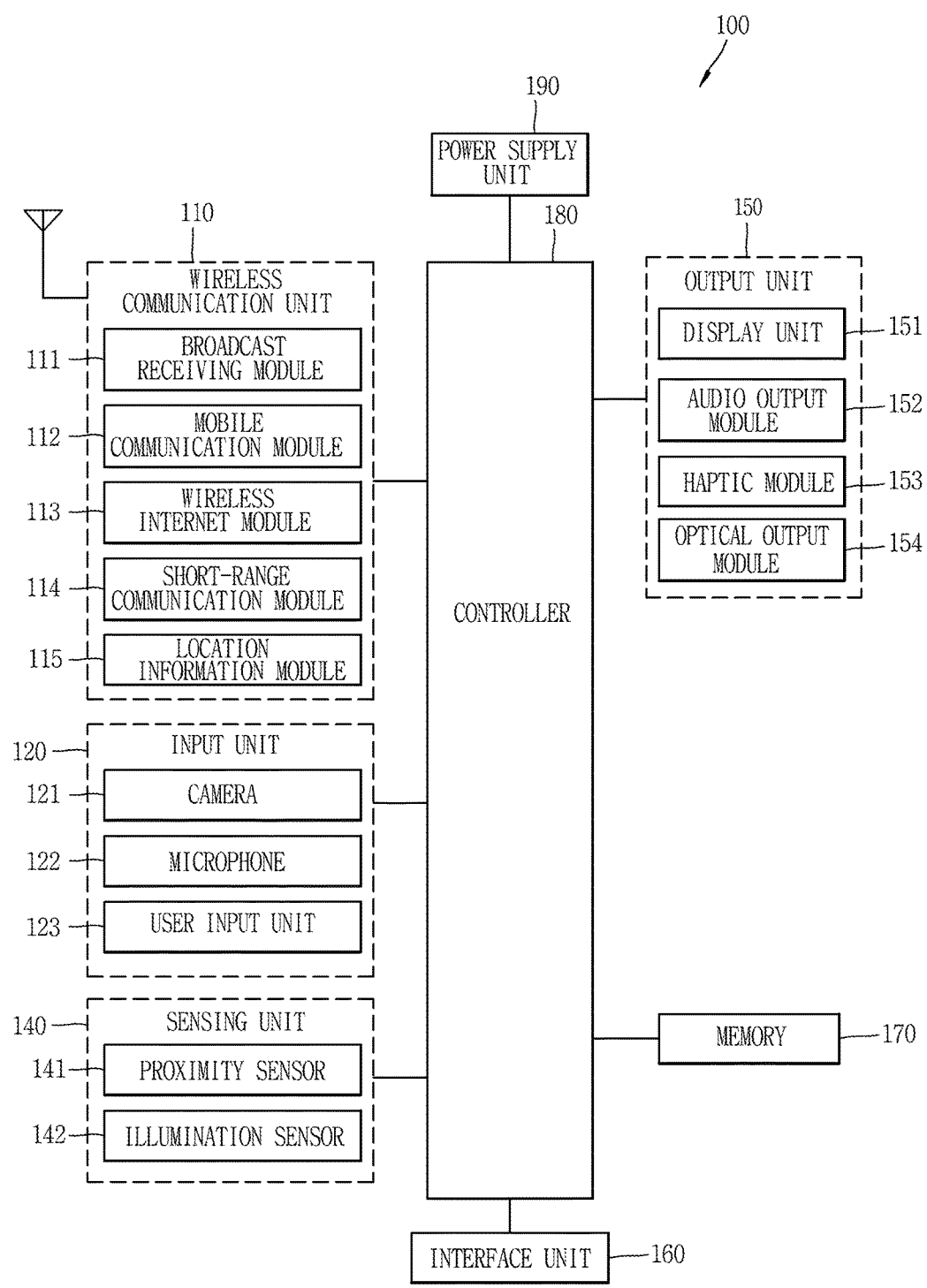
FIG. 1 is a block diagram illustrating a control device for a vehicle in accordance with the present invention.

FIG. 1 is a block diagram illustrating a control device for a vehicle in accordance with the present invention.

The control device 100 for a vehicle may include a wireless communication unit 110, an Audio/Video (A/V) input unit 120, a sensing unit 140, an output unit 150, a memory 160, an interface unit 170, a controller 180, a power supply unit 190, and the like. However, all of the elements as illustrated in FIG. 1 are not necessarily required, and the mobile terminal may be implemented with greater or less number of elements than those illustrated elements.

In more detail, the wireless communication unit 110 of the components may typically include one or more modules which permit wireless communications between the control device 100 for the vehicle and a wireless communication system, between the control device 100 for the vehicle and another control device for a vehicle, or between the control device 100 and an external server. Also, the wireless communication unit 110 may include at least one module for connecting the control device for the vehicle to at least one network.

The wireless communication unit 110 may include a broadcast receiving module 111, a mobile communication module 112, a wireless internet module 113, a short-range communication module 114, a position location module 115 and the like.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the control device 100, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The control device 100 for the vehicle disclosed herein may be configured to utilize information obtained from one or more sensors of the sensing unit 140, and combinations thereof.

An optical sensor (light sensor, photo sensor) may acquire front and rear images of the vehicle and/or surrounding images based on the vehicle. The optical sensor may detect an object from the acquired images.

The optical sensor may include an image sensor and an image processing module. The optical sensor may process a still image or video obtained by the image sensor (e.g., CMOS or CCD). The image processing module may process the still image or video acquired through the image sensor to extract necessary information, and transfer the extracted information to the controller 180.

A processor included in the optical sensor may be controlled by the controller 180. In other words, the controller 180 may detect an object from an image received from the optical sensor, and calculate collision probability with the detected object.

The optical sensor may include a front camera module, an around view camera module, an inner camera module, and a rear camera module.

The front camera module may include a stereo camera module. In this instance, a processor of the camera module 131a may calculate a distance from an object located at the front, a relative speed with an object detected from an image, and distances among a plurality of objects.

The front camera module may include a time of flight (TOF) camera module. In this instance, the front camera module may include a light source (e.g., infrared light or laser beams), and a receiving portion. A processor of the front camera module or the controller 180 may detect a distance up to an object located at the front, a relative speed with an object, and distances among a plurality of objects, on the basis of the TOF which is taken until infrared light or laser beam output from the light source is received by being reflected due to an object.

Meanwhile, when the front camera module is a mono camera module, a distance from an object and a relative speed with the object may be calculated on the basis of a size of the object located at the front according to time.

The around view camera module may include a plurality of camera modules. For example, the plurality of camera modules may be arranged on left, rear, right and front sides of the autonomous vehicle.

The left camera module may be disposed within a case which surrounds a left side mirror. Or, the left camera module may be disposed on an outside of the case surrounding the left side mirror. Or, the left camera module may be disposed on one area outside a left front door, a left rear door or a left fender.

The right camera module may be disposed within a case which surrounds a right side mirror. Or, the right camera module may be disposed on an outside of the case surrounding the right side mirror. Or, the right camera module may be disposed on one area outside a right front door, a right rear door or a right fender.

Meanwhile, the rear camera module may be disposed adjacent to a rear license plate, a trunk or a tail gate switch.

The front camera module may be disposed adjacent to an emblem or radiator grill.

The processor of the optical sensor or the controller 180 may generate a surrounding image of the autonomous vehicle by combining images captured by the plurality of camera modules, respectively. In this instance, the surrounding image of the autonomous vehicle may be output as a top view image or a bird-eye image through the display unit 151.

The inner camera module may capture an inner side of the vehicle. The inner camera module may acquire images for passengers. A processor of the inner camera module may acquire images of passengers within the vehicle, and detect how many passengers ride on the vehicle or on which seats the passengers sit. For example, the inner camera module may detect a presence or absence of a fellow passenger and a seated position of the fellow passenger if the fellow passenger is present.

The inner camera module may acquire an image for recognizing a biometric signal of the passenger. The processor of the inner camera module may verify (check) an ID of the passenger based on a facial image of the passenger.

The rear camera module may include a stereo camera module. In this instance, a processor of the camera module 131d may detect a distance up to an object located at the rear, a relative speed with an object detected from an image, and distances among a plurality of objects, using a disparity difference detected from a stereo image.

The rear camera module, similar to the front camera module, may include a time of flight (TOF) camera module and/or a mono camera module.

An object detected by an ultrasonic sensor, a radar or LiADAR may be used in a manner of matching an object detected from an image acquired by the optical sensor.

The radar module may include an electromagnetic wave transmitting unit, a receiving unit and a processor. The radar module may be implemented as a pulse radar or a continuous wave radar according to a principle of emitting electric waves. Also, the radar module may be implemented as a frequency modulated continuous wave (FMCW) radar or a frequency shift keyong (FSK) wave according to a signal waveform among continuous wave radars.

The radar module may detect an object based on a transmitted electromagnetic wave, and detect a distance up to the detected object and a relative speed with the detected object. When the object is a stationary object (e.g., a roadside tree, a streetlight, a traffic light, a traffic sign, etc.), the radar module may detect a driving speed of the vehicle on the basis of the TOF by the object.

A LiADAR module may include a laser transmitting unit, a receiving unit and a processor. The LiADAR module may be implemented in a time of flight (TOF) manner or a phase-shift manner.

The TOF-type LiADAR module may output a laser pulse signal, and receives a reflective pulse signal which is reflected on an object. The LiADAR module 133 may measure a distance from the object based on a time taken until the laser pulse signal is output and the reflective pulse signal is received. Also, a relative speed with the object can be measured on the basis of changes in distance according to time.

Meanwhile, the phase-shift type LiADAR module may emit a laser beam which has a specific frequency and is continuously modulated, and measure a time and a distance up to an object on the basis of a phase variation of a signal which comes back after being reflected due to the object. Also, a relative speed with the object can be measured based on changes in distance according to time.

The LiADAR module may detect an object based on a transmitted laser, and detect a distance and relative speed with the detected object. When the object is a stationary object (e.g., a roadside tree, a streetlight, a traffic light, a traffic sign, etc.), the LiADAR module may detect a driving speed of the autonomous vehicle on the basis of the TOF by the object.

An ultrasonic sensing module may include an ultrasonic transmitting unit, a receiving unit and a processor. The ultrasonic sensing module may detect an object based on a transmitted ultrasonic wave, and detect a distance and relative speed with the detected object. When the object is a stationary object (e.g., a roadside tree, a streetlight, a traffic light, a traffic sign, etc.), the ultrasonic sensing module may detect a driving speed of the vehicle 100 on the basis of the TOF by the object.

A vehicle state sensor module senses various situations (conditions) of the vehicle. To this end, the vehicle state sensor module may include a collision sensor, a wheel sensor, a velocity sensor, a tilt sensor, a weight detecting sensor, a heading sensor, a yaw sensor, a gyro sensor, a position module, a vehicle forward/backward movement sensor, a battery sensor, a fuel sensor, an acceleration sensor, a tire sensor, a steering sensor by a turn of a handle, an autonomous vehicle internal temperature sensor, a vehicle internal humidity sensor, an illumination sensor and the like.

Accordingly, the vehicle state sensor module may acquire sensing signals with respect to information related to a car collision, a direction of the vehicle, a location (GPS) of the vehicle, an angel of the vehicle, a driving speed of the vehicle, an acceleration of the vehicle, a tilt of the vehicle, a forward/backward movement of the vehicle, a battery, a fuel, a tire, a vehicle lamp, internal temperature of the vehicle, internal humidity of the vehicle, a turning angle of a steering wheel, ambient brightness, weights of passengers and things within a vehicle, and the like.

Meanwhile, the vehicle state sensor module may further include an acceleration pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The output unit 150 may generate a visual, audible or tactile output, and may include at least one of the display unit 151, the audio output module 152, the haptic module 153 and an optical output module 154. The display unit 151 may implement a touch screen as being layered or integrated with a touch sensor. The touch screen may function as the user input unit 123 providing a user input interface between the control device 100 for the vehicle and the user and simultaneously providing an output interface between the control device 100 for the vehicle and the user.

The interface unit 160 may serve as a path allowing the control device 100 for the vehicle to interface with various types of external devices connected thereto. The interface unit 160 may include any of wired or wireless ports, external power supply ports, wired or wireless data ports, memory card ports, ports for connecting a device having an identification module, audio input/output (I/O) ports, video I/O ports, earphone ports, and the like. In some cases, the control device 100 for the vehicle may perform assorted control functions associated with a connected external device, in response to the external device being connected to the interface unit 160.

Also, the memory 170 is typically implemented to store data to support various functions or features of the control device 100 for the vehicle. For instance, the memory 170 may be configured to store application programs executed in the control device 100 for the vehicle, data or instructions for operations of the control device 100 for the vehicle, and the like. Some of these application programs may be downloaded from an external server via wireless communication. Other application programs may be installed within the control device 100 for the vehicle at time of manufacturing or shipping, which is typically the case for basic functions of the control device 100 for the vehicle (for example, receiving a call, placing a call, receiving a message, sending a message, and the like). It is common for application programs to be stored in the memory 170, installed in the control device 100 for the vehicle, and executed by the controller 180 to perform an operation (or function) for the control device 100 for the vehicle.

The controller 180 typically functions to control overall operation of the control device 100 for the vehicle, in addition to the operations associated with the application programs. The controller 180 may provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 may control at least two of those components included in the mobile terminal to activate the application program.

The power supply unit 190 can be configured to receive external power or provide internal power in order to supply appropriate power required for operating elements and components included in the control device 100 for the vehicle. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the control device 100 for the vehicle by an activation of at least one application program stored in the memory 170.

Hereinafter, description will be given in more detail of the display unit 151 with reference to FIG. 1A, prior to describing various embodiments implemented through the control device 100 for the vehicle.

The display unit 151 is generally configured to output information processed in the control device 100 for the vehicle. For example, the display unit 151 may display execution screen information of an application program executing at the control device 100 for the vehicle or user interface (UI) and graphic user interface (GUI) information in response to the execution screen information.

As another example, the display unit 151 may output vehicle-related information. Here, the vehicle-related information may include vehicle control information for a direct control of the vehicle, or a vehicle driving assist information for providing a driving guide to a driver. Also, the vehicle-related information may include vehicle state information notifying a current state of the vehicle, or vehicle driving information related to driving of the vehicle.

The display unit 151 may include at least one of a liquid crystal display (LCD), a thin film transistor-liquid crystal display (TFT-LCD), an organic light emitting diode (OLED), a flexible display, a 3-dimensional (3D) display, an e-ink display, and combinations thereof.

Also, the display unit 151 may be implemented using two or more display devices according to an implemented shape of the control device 100 for the vehicle. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit such that a user can input a control command in a touching manner.

In detail, the display unit 151 may include a display and a touch sensor, and the touch sensor and the display may organically operate under the control of the controller. For example, when a touch is applied to the display unit 151, the touch sensor may detect the touch and the controller 180 may generate a control command corresponding to the touch based on it. The controller 180 may detect a touch applied to the touch sensor even in a power-off state of the display and perform a control corresponding to the detected touch. Contents input by the touching method may be characters, numbers, instructions in various modes, or menu items to be designated.

In this manner, the display unit 151 may form a touch screen together with the touch sensor, and in this instance, the touch screen may function as the user input unit 123 (see FIG. 1A).

Meanwhile, the display unit 151 may include a cluster which allows the driver to check vehicle status information or vehicle driving information as soon as driving the vehicle. The cluster may be located on a dashboard. In this instance, the driver may check information output on the cluster while viewing the front of the vehicle.

Meanwhile, according to an embodiment, the display unit 151 may be implemented as a head up display (HUD). When the display unit 151 is implemented as the HUD, information may be output through a transparent display provided on a wind shield. Or, the display unit 151 may be provided with a projection module and thus output information through an image projected on the wind shield.

Depending on embodiments, the display unit 151 may include a transparent display. In this instance, the transparent display may be attached to the wind shield.

The transparent display may have predetermined transparency and output a predetermined screen. To have the transparency, the transparent display may include at least one of a transparent thin film electroluminescent (TFEL) display, a transparent OLED display, a transparent LCD display, a transmittive transparent display, and a transparent LED display. The transparency of the transparent display may be adjustable.

At least some of the aforementioned components may be operable to implement operations, controls or control methods of the control device 100 for the vehicle according to the following various embodiments. Also, the operation, control or control method of the control device 100 for the vehicle may be implemented on the vehicle control device 100 by executing at least one application program stored in the memory 170.

Meanwhile, various embodiments described herein may be implemented in a computer-readable medium, or similar medium using, for example, software, hardware, or any combination thereof.

Hereinafter, description will be given of exemplary embodiments associated with a control method which can be implemented in the vehicle control device having such configuration, with reference to the accompanying drawings. It will be obvious to those skilled in the art that the present invention can be specified into other particular forms without departing from the spirit and essential characteristics of the present disclosure.

Hereinafter, the accompanying drawings will be described in a clockwise direction or in the order of top to bottom, on the basis of a left-top drawing.

Figure 2:
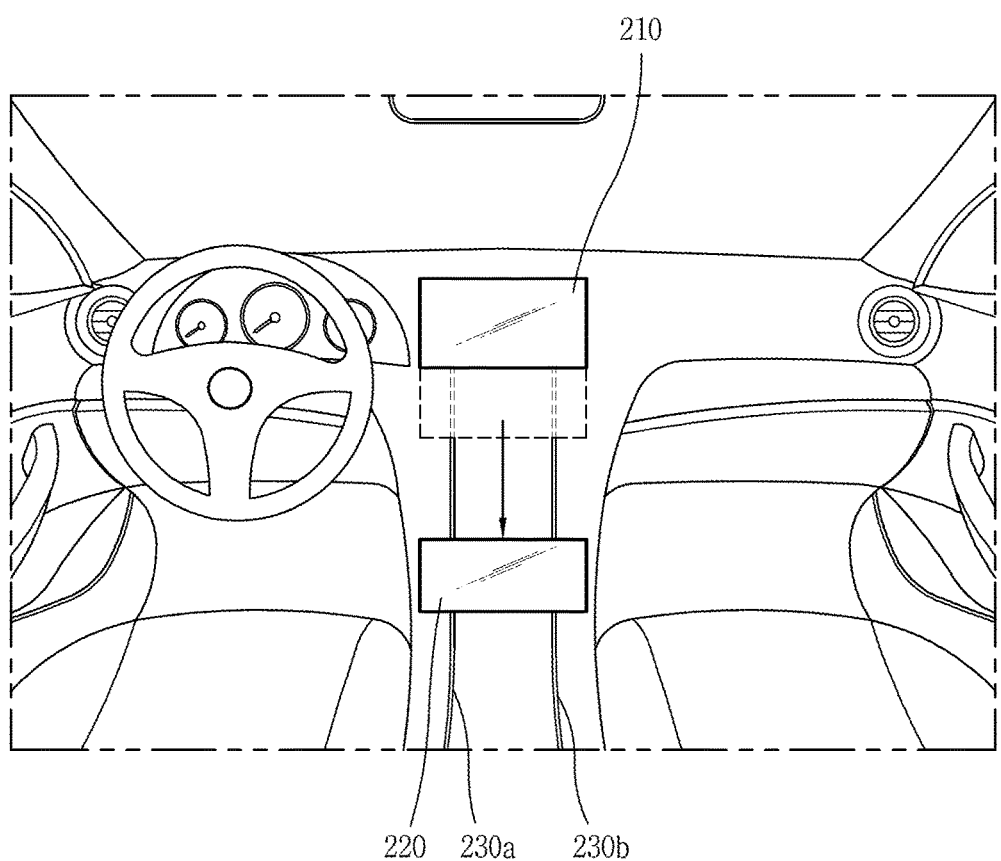
FIG. 2 is a view illustrating first and second displays and a guide disposed on a front side within a vehicle.
Figure 3A:
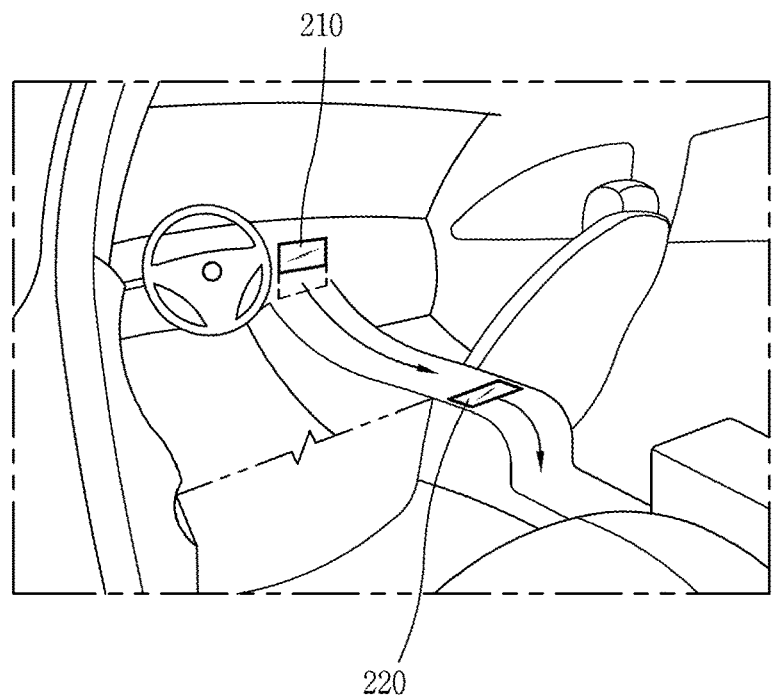
FIGS. 3A and 3B are views illustrating various embodiments of the guide of FIG. 2.
Figure 3B:
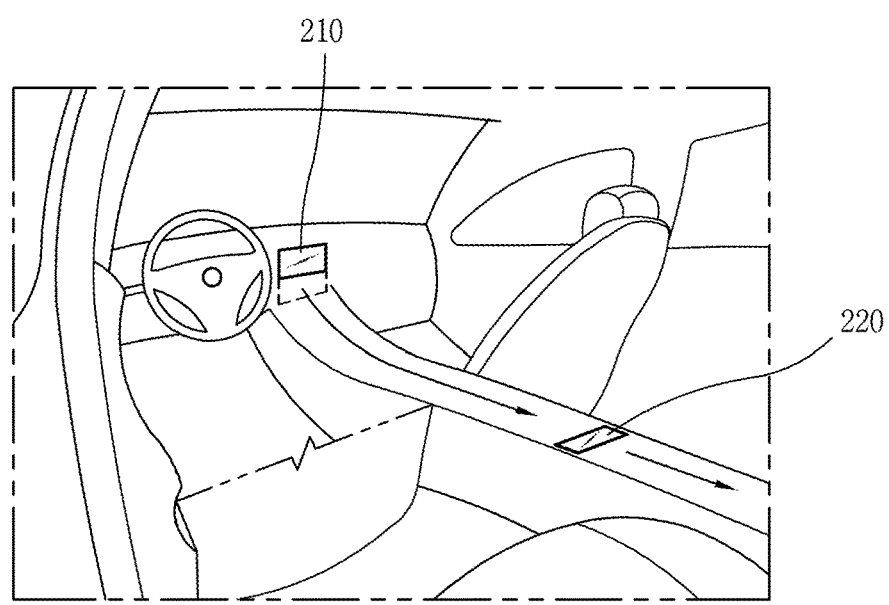

FIG. 2 is a view illustrating first and second displays and a guide which are disposed at the front within a vehicle, and FIGS. 3A and 3B are views illustrating various embodiments of the guide.

A vehicle may include therein a driver seat, a passenger seat (a seat next to the driver), and a dashboard provided at the front of the driver seat and the passenger seat and provided with various meters required for driving.

The dashboard includes a speedometer, a cluster outputting information required for driving, a steering wheel allowing for adjusting a driving direction of the vehicle, and a center fascia with a board for adjusting an audio and an air conditioner.

The center fascia is located between the driver seat and the passenger seat. The center fascia is a portion at which the dashboard and a shift lever perpendicularly meet with each other. A controller of audio/air conditioner/heater, a navigator, a ventilation, a cigar jack and an ashtray, a cup holder and the like are installed on the center fascia. When the dashboard is formed in a shape like an alphabet T, the center fascia may serve as a wall partitioning the driver seat and the passenger seat, together with a center console.

With development of a touch screen technology, button-type controllers disposed on the center fascia disappear and a touch screen appears on the center fascia. The disappeared button-type controller may be transformed into an icon or a graphic object so as to be implemented on the touch screen in a software configuration.

For example, when desiring to adjust temperature by turning an air conditioner on, a user can execute a function associated with the air conditioner by applying a touch onto the touch screen, and adjust the temperature using graphic objects included on an air conditioner execution screen.

As the touch screen is disposed on the center fascia, the vehicle control device 100 may provide passengers who ride on the vehicle with various visual information through the touch screen. However, information provided to a driver is limited according to the law of each country. For example, a number of characters to be outputtable on one screen may be limited or a video reproduction may be prohibited while a driver drives a vehicle at a predetermined speed or more.

In spite of allowing every passenger in the vehicle as well as the driver to use the touch screen disposed on the center fascia, information provided to each passenger is limited due to the driver.

To solve this problem, the vehicle control device or the vehicle according to the present invention may include a first display 210 located on the center fascia, a second display 220 located at a lower side of the first display 210, and a guide for guiding a movement of at least one of the first and second displays 210 and 220 in a direction from front to rear sides of the vehicle.

The drawing illustrates that the movement of the second display 220 is guided by two guides 230a and 230b, but the movement of the at least one of the first and second displays 210 and 220 may alternatively be guided by at least one guide.

The guide is located between the driver seat and the passenger seat, and at least part of the guide extends in a direction from front to rear sides of the vehicle. For example, the at least part of the guide may extend from the center fascia up to a space in front of a rear seat as illustrated in FIG. 3A, or extend from the center fascia onto the rear seat.

Accordingly, at least one of the first and second displays 210 and 220 may be movable from the center fascia to the rear seat through a space between the driver seat and the passenger seat.

According to the movement of the at least one of the first and second displays 210 and 220, the first and second displays 210 and 220 may be coupled (connected, combined) to or separated from each other.

The controller 180 may control at least one of the first and second displays 210 and 220 such that information output on the at least one of the first and second displays 210 and 220 can vary based on a position of the second display 210.

For example, when the first and second displays are connected to each other to operate as a single display, the controller 180 controls output information on the basis of the driver. Here, the driver basis refers to limiting output information according to the law.

On the other hand, when the first and second displays 210 and 220 are separated from each other to operate individual displays, the controller 180 controls the first display 210 as a display for the driver, and the second display 220 as a display for a passenger. For example, navigation information may be output on the first display 210, and a video may be reproduced on the second display 220.

While the first and second displays 210 and 220 operate individually in the separated state, when they are connected to each other again, information output on the second display 220 may disappear and information output on the first display 210 may extend even to the second display 220 for output. For example, the navigation information output only on the first display 210 may be output on both of the first and second displays 210 and 220.

This may provide an effect of extension or separation of a display area on which information is output. Therefore, the driver or a passenger who is sitting next to the driver can change a position of a display to extend or separate the display to be suitable for a situation.

Meanwhile, as aforementioned, the controller 180 may output different types of information using a position of at least one of the first and second displays 210 and 220.

As an example, hereinafter, a flowchart of a control method of outputting different types of information and controlling functions by connecting the first and second displays will be described.

Figure 4:
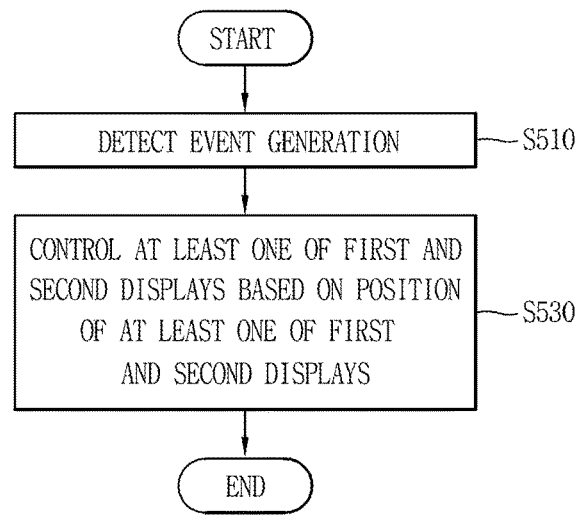
FIG. 4 is a flowchart representatively illustrating a control method in accordance with the present invention.

FIG. 4 is a flowchart representatively illustrating a control method in accordance with the present invention.

First, the controller detects an event generation (S410).

The event, for example, may be a movement of at least one of the first and second displays 210 and 220, a touch input applied to at least one of the first and second displays 210 and 220, a start-on of the vehicle, and an event generated on at least one application.

The application is a concept including a widget, a home launch and the like, and refers to every type of program executable on the vehicle. Therefore, the application may be a program of performing a function, such as an advanced driver assistance system (ADAS), a navigation, the weather, a radio, a web browser, an audio reproduction, a video reproduction, a message transmission and reception, a schedule management or an application update.

The event generation, for example, may correspond to a generation of a warning signal set in the ADAS, a generation of a control set in the ADAS, a missed call, a presence of an application to be updated, an arrival of a message, a start-on, a start-off, an ON/OFF of an autonomous driving mode, pressing a display (LCD) awake key, an alarm, an incoming call, a missed notification, and the like.

As another example, when specific information is received through a wireless communication unit of a terminal, it indicates that an event is generated from an application associated with the specific information, and the controller detects it. Or, when a brake is operated, irrespective of pressing a brake pedal, in response to a detection of an object which has more than a predetermined level of collision probability in a driving direction, it indicates that an event is generated from an autonomous emergency braking (AEB) application. When a driving lane departure is detected, it indicates that an event is generated from a lane keeping assistance system (LKAS) application.

Next, the controller 180 controls at least one of the first and second displays based on a position of the at least one of the first and second displays (S530)

In response to the event generation, screen information corresponding to the event is output. In this instance, the controller may control at least one of the first and second displays to output a different type of information according to the position of the at least one of the first and second displays. For example, information output on the second display may differ according to the position of the second display.

Also, even though substantially the same information is output, an output position and/or an output method of the information may differ according to the position of the at least one of the first and second displays.

The second display 220 may be used as a display extending the first display 210 or a display independently operating regardless of the first display 210, according to the position thereof. In addition, the second display 220 may be used as an input unit for receiving a user input to control the information output on the first display 210.

As one example, when the first and second displays 210 and 220 are in a contact state or spaced apart from each other by a predetermined distance, an execution screen of a navigation application may be output on both of the first and second displays 210 and 220 in a dividing manner. In this instance, the first and second displays 210 and 220 may construct one display area, and passengers can be provided with road guidance information on a display area in a maximum size.

When the spaced distance is within a predetermined distance, the first and second displays 210 and 220 operate as one display. For example, when a first screen is switched into a second screen by a user input, the first screen output on the first and second displays 210 and 220 may be changed into the second screen at once.

To measure the spaced distance, a sensor for detecting a position of at least one of the first and second displays 210 and 220 on the guide 230 may further be provided. The sensor may detect a first coordinate range corresponding to a position of the first display 210, and a second coordinate range corresponding to a position of the second display 220.

The controller 180 may calculate the spaced distance using the first and second coordinate ranges. For example, the spaced distance may be a distance between a lower end of the first display 210 and an upper end of the second display 220, or may be measured as a distance between an upper end of the first display 210 and a lower end of the second display 220.

Afterwards, when the second display is moved by being slid along the guide, the position of the second display may change.

When the spaced distance is greater than the predetermined distance, the first and second displays 210 and 220 construct different display areas from each other. The execution screen of the navigation application is continuously output on the first display unit 210, and preset screen information instead of the execution screen of the navigation application may be output on the second display 220. Here, the preset screen information may vary in different manners according to embodiments.

When the spaced distance is greater than the predetermined distance, the first and second displays 210 and 220 operate in an individual manner. For example, even though the first screen output on the first display 210 is switched into the second screen, the information output on the second display 220 may not change. That is, a touch input applied to each display is defined as a control command for each display, and does not affect another display.

Meanwhile, the predetermined distance may be defined as a distance at which the second display is not viewed by the driver's eyes when the driver faces the first display with the eyes. That is, the predetermined distance may be defined as a distance by which the first display and the second display are spaced apart from each other such that the second display does not come in the driver's sight when the driver views the first display with the eyes. In this instance, since the second display does not interfere with driving, restriction-applied information may be output on the first display for the driver, and information without restriction may be output on the second display for a passenger on the passenger seat or a rear seat. The predetermined distance may vary in different manners according to a vehicle and a driver.

Meanwhile, the controller 180 may also control information output on the first and second displays on the basis of an absolute position of the second display, other than a relative position between the first and second displays. In this instance, irrespective of the spaced distance, the controller 180 may control the second display to output a different type of information according to coordinates of the second display.

With providing such movable display, a different type of information which is specialized for each of a plurality of passengers sitting in different seats may be provided to the plurality of passengers. When only a driver has got on the vehicle, information can be provided on a great screen by using one display area including a plurality of displays.

The aforementioned control method according to the present invention may be embodied into various forms, as illustrated in FIGS. 5 to 12B. Hereinafter, the same/like reference numerals will be used for the same or similar components to the aforementioned embodiment, in detailed embodiments to be explained, and description thereof will be omitted.

Figure 5:
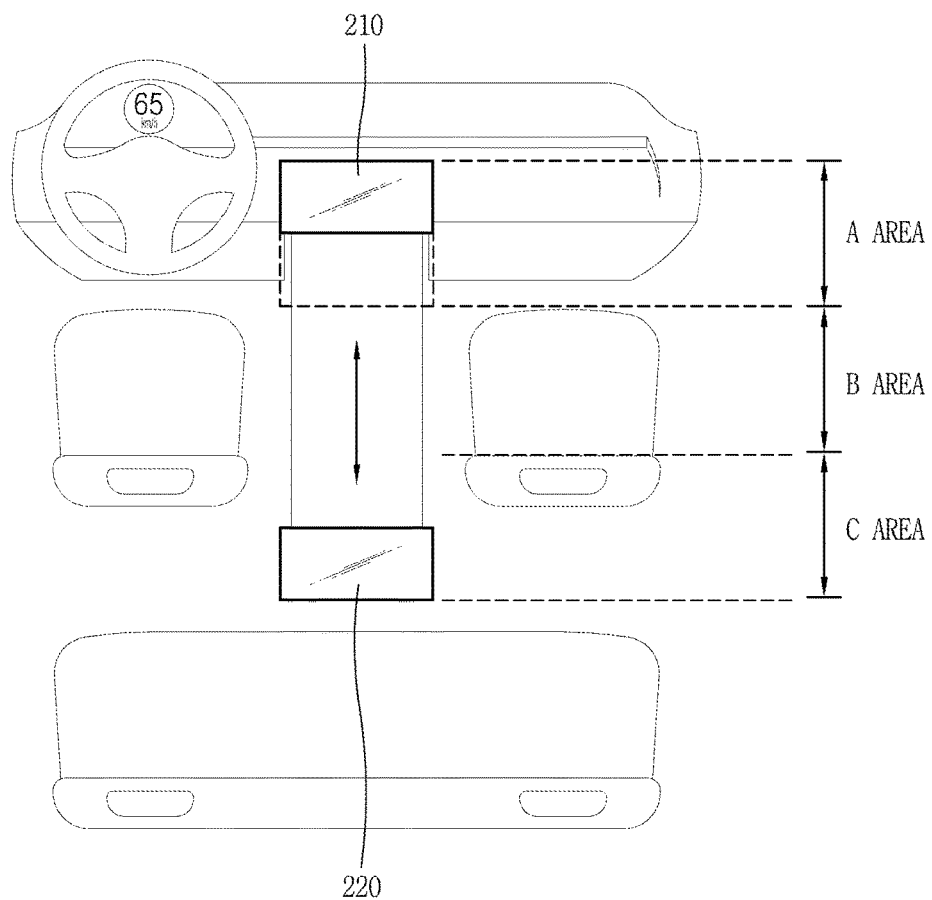
FIG. 5 is a conceptual view illustrating a position of a second display.

First, areas where a display can be located are defined. FIG. 5 is a conceptual view illustrating a position of the second display.

The areas may include a center fascia area (area A), a passenger seat area (area B), and a rear seat area (area C).

The center fascia area (area A) may be defined as an area in which a wind shield comes in the driver's sight even though the driver views the center fascia area, and thus the driver can see the front of the vehicle. An area where controllers for an air conditioner, a radio and the like in the related art are arranged may be included in the center fascia area. That is, the center fascia area (area A) may be an area for providing visual information to the driver and also an area of generating restriction for information output thereon during driving according to laws and regulations.

The center fascia area (area A) is defined as an area for the driver.

On the other hand, the passenger seat area (area B) and the rear seat area (area C) may be defined as areas in which the wind shield does not come in the driver's sight when the driver views the corresponding area. In other words, those areas refer to areas without being included in the driver's visual field when the driver views the wind shield or a cluster with the eyes.

The passenger seat area (area B) and the rear seat area (area C) may be divided by a position of the passenger seat. The passenger seat area (area B) and the rear seat area (area C) may differ according to the position of the passenger seat.

The passenger seat area (area B) may be defined as an area in which a passenger sitting in the passenger seat can view by turning his or her head in a state that his or her upper body faces the front while the passenger sits in the passenger seat. That is, the passenger seat area (area B) may be defined as an area for a passenger sitting in the passenger seat.

The rear seat area (area C) may be defined as an area that a hand of a passenger in a rear seat reaches. That is, the rear seat area (area C) is defined as an area for a passenger sitting in the rear seat.

When the second display 220 is located in the center fascia area (area A), the controller 180 controls the second display 220 to output information which the driver can see while driving according to laws and restrictions.

On the other hand, when the second display 220 is located in the passenger seat area (area B) or the rear seat area (area C), the controller 180 may control the second display 220 to output a user interface specialized for a passenger in the passenger seat or a passenger in the rear seat.

For example, when the second display 220 is located in the passenger seat area (area B), the second display 220 may provide an interface for adjusting electric components associated with the passenger seat.

Here, the electric components may include a temperature adjustment device, an audio output device, a wind adjustment device, a window adjustment device and the like. The electric components installed in the vehicle may be classified into electric components included in a front group and electric components included in a rear group according to installed positions.

When the second display 220 is located in the passenger seat area (area B), the second display 220 may output thereon graphic objects linked with control functions of the electric components included in the front group. For example, the second display 220 may output interfaces for adjusting the electric components associated with the passenger seat, such as a window adjustment interface for adjusting a window arranged at the passenger seat, a volume adjustment interface for adjusting a volume of an audio arranged at the passenger seat, and the like.

On the other hand, when the second display 220 is located in the rear seat area (area C), graphic objects which are linked with control functions of the electric components included in the rear group may be output on the second display 220. For example, an interface for setting temperature of the rear seat may be output.

Meanwhile, the areas are merely illustrative, and a number of areas and a position of each area may be defined differently according to embodiments.

Hereinafter, operations of the first and second displays when an event which is a movement of the second display is detected will be described in detail.

FIGS. 6A to 6D are conceptual views illustrating an operation when first and second displays in a connected (combined) state are separated from each other.

Referring to FIG. 6A, when the first and second displays 210 and 220 are in a contact state or spaced apart from each other by a predetermined distance or less, the controller 180 controls the first and second displays 210 and 220 to output an execution screen of an application in a dividing manner. That is, the first and second displays 210 and 220 operate as one display.

When the spaced distance increases to be greater than the predetermined distance while outputting the execution screen of the application on the first and second displays 210 and 220 in the dividing manner, the controller 180 controls the first and second displays 210 and 220 such that the execution screen of the application is output on the first display 210 and preset screen information is output on the second display 220.

In this instance, the execution screen of the application which was output on the first display 210 may change.

When the first and second displays are in a combined (connected, coupled) state, the execution screen may be output to correspond to a size of a display area including both of the first and second displays. For example, if an aspect ratio of the first display is m:n1 and an aspect ratio of the second display is m:n2, an aspect ratio of the execution screen is m:(n1+n2).

When the first and second displays are separated from each other, the execution screen which was output in the ratio of m:(n1+n2) may be scaled down to m:n1 and output on the first display, or changed into a size corresponding to the size of the first display. When the execution screen is changed, the controller may edit the execution screen for output based on the screen ratio of the first display, or selectively output one execution screen corresponding to the screen ratio of the first display among execution screens in various sizes, which are provided from the application.

Meanwhile, the preset screen information may be a home screen page, for example. The home screen page may include at least one object, and the object may be an icon or widget of an application installed on the vehicle control device.

The preset screen information may differ according to the spaced distance or the position of the second display 220. That is, a type of home screen page output on the second display 220 may differ according to the spaced distance or the position of the second display 220.

In detail, the preset screen information may include icons included in a first group when the second display is located within a first range. On the other hand, the preset screen information may include icons included in a second group, other than the icons included in the first group, when the second display is located within a second range different from the first range.

For example, when the second display 220 is moved to the passenger seat area (area B), a preset passenger seat home screen page is output for a passenger sitting in the passenger seat. On the other hand, when the second display 220 is moved to the rear seat area (area C), a preset rear seat home screen page may be output for a passenger sitting in a rear seat.

As aforementioned, the passenger seat home screen page may include objects of applications for controlling electric components associated with the passenger seat, and the rear seat home screen page may include objects of applications for controlling electric components associated with the rear seats.

The first and second groups may further commonly include at least one icon. For example, an icon of an application, which is to be commonly used by passengers sitting in the passenger seat and the rear seats, such as a video reproduction, a web browser and the like, may be included in each of the first and second groups.

Meanwhile, the home screen page currently output on the second display 220 is merely illustrative, and the preset screen information may variously change according to embodiments.

Figure 6B:
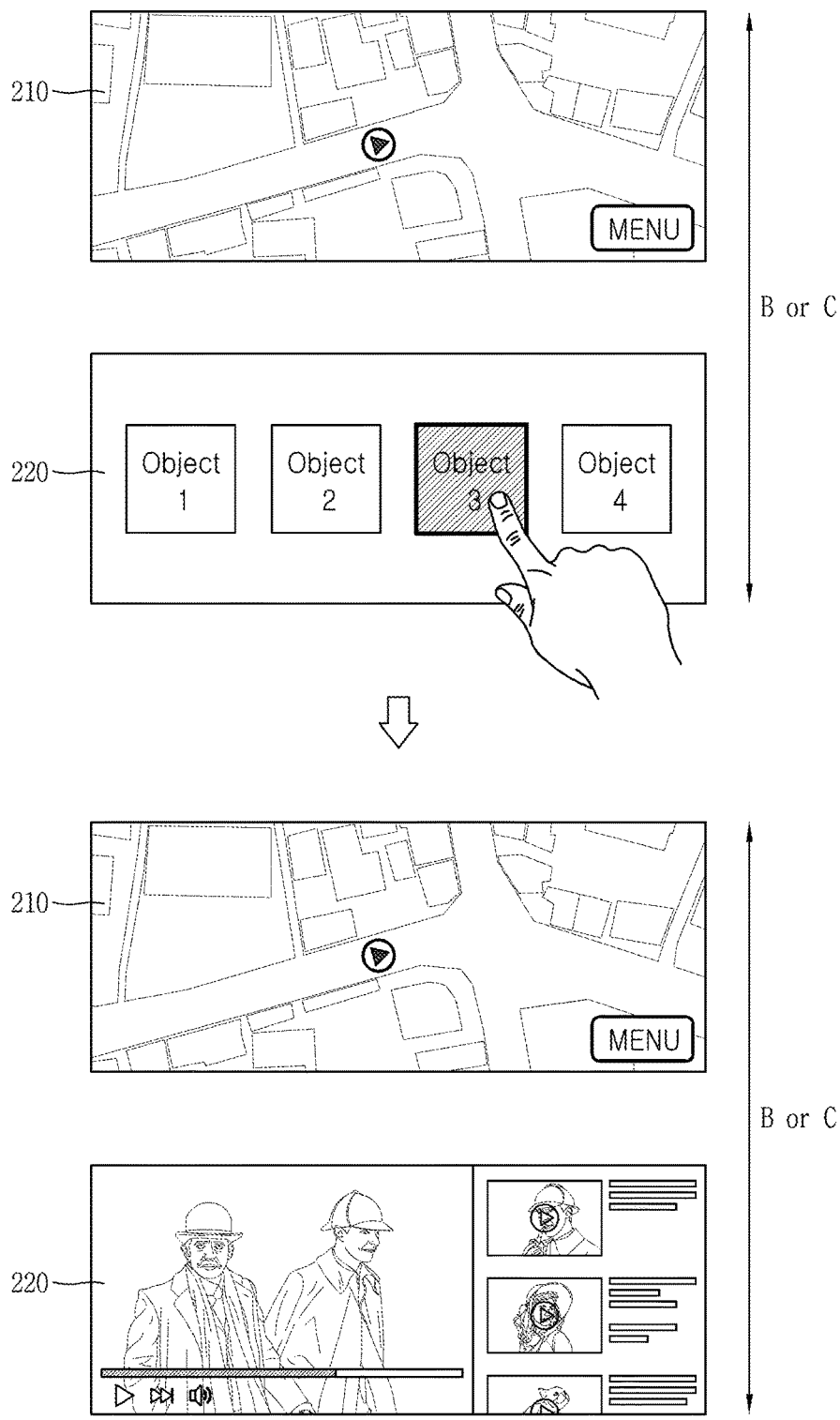

Referring to FIG. 6B, while preset screen information including a plurality of graphic objects is output on the second display 220, a touch input may be applied to one of the graphic objects.

In this instance, the controller 180 executes an application corresponding to the touch-applied one graphic object. Accordingly, an execution screen of a first application is output on the first display 210 and an execution screen of a second application is output on the second display 220.

Figure 6C:
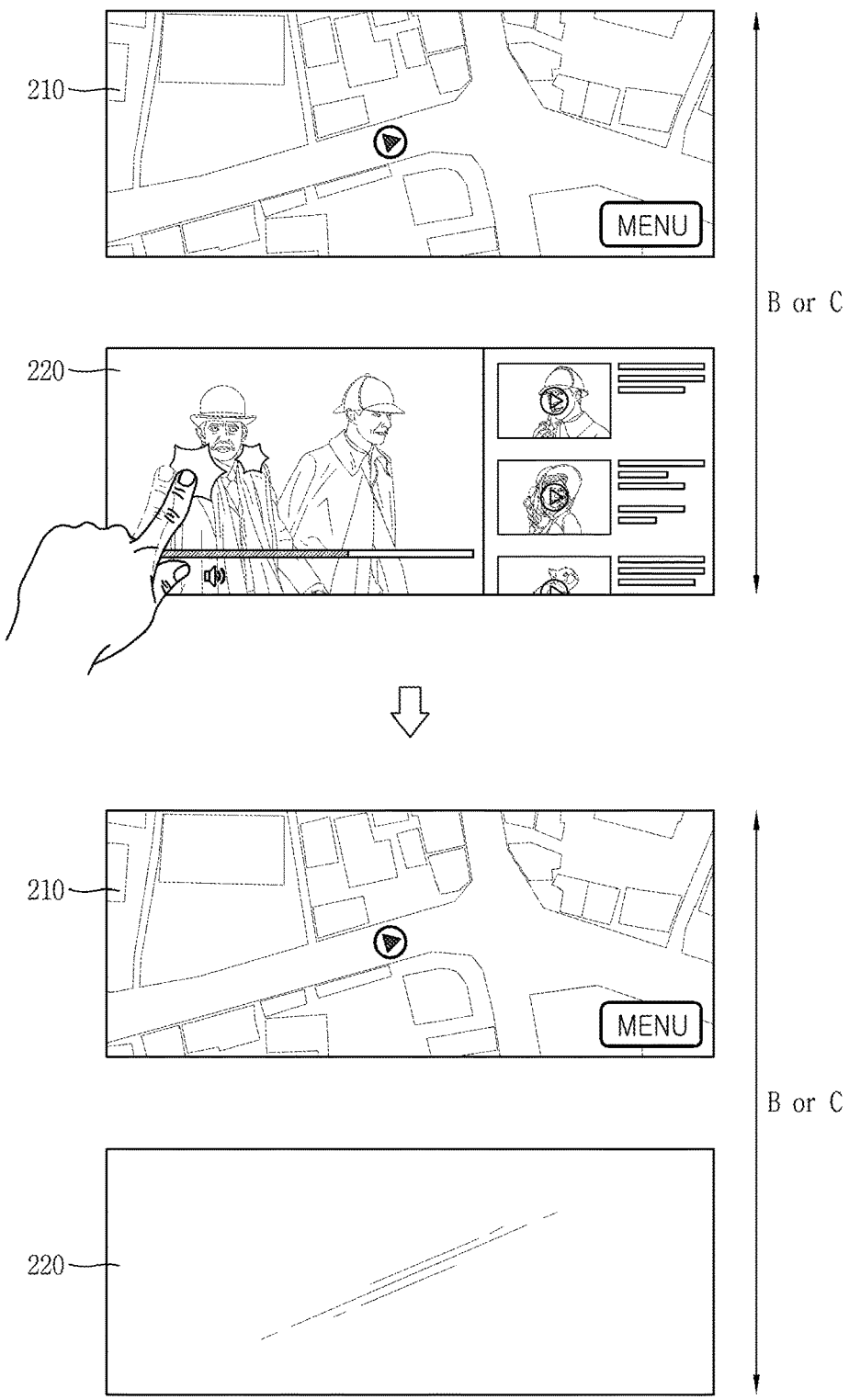

In addition, as illustrated in FIG. 6C, the second display 220 may be turned off in response to a user input applied to the second display 220, but the first display 210 may continuously output the execution screen of the first application. In detail, while first screen information is output on the first display 210 and second screen information is output on the second display 220, when a preset touch input is applied to the second display 220, the controller 180 controls the second display 220 to be turned off.

As illustrated in FIGS. 6B and 6C, when a touch input is applied to one of the first and second displays while the spaced distance is greater than the predetermined distance, the controller 180 controls the first and second displays in a manner that information currently output on the one display is changed into another information, and information currently output on the other display is continuously output thereon. That is, the first and second displays 210 and 220 operate in an individual manner.

On the other hand, as illustrated in FIG. 6A, when a touch input is applied while the first and second displays are in the contact state or spaced apart from each other by the predetermined distance or less, the controller controls the first and second displays to change information currently output on the first and second displays into another information. That is, the first and second displays 210 and 220 organically operate like a single display.

Although not illustrated, while the execution screen of the first application is output on the first display 210 and the execution screen of the second application is output on the second display 220, the second display 220 may be moved to reduce the spaced distance by the predetermined distance or less or to be brought into contact with the first display 210.

In this instance, the controller 180 controls the second display 220 not to output the execution screen of the second application anymore and to output the execution screen of the first application.

That is, when the first and second displays 210 and 220 in the separated state are connected to each other, information which was output on the first display 210 may extend to the second display 220 for output.

As illustrated in FIG. 6D, when the second display 220 separated from the first display 210 was turned off, the controller 180 turns the second display 220 on, in response to the first and second displays 210 and 220 being connected to each other, and output information output on the first display 210 on both of the first and second displays 210 and 220. Accordingly, a content output on the first display 210 may increase in size and be output on both of the first and second displays 210 and 220, or new information which has not been output on the first display 210 may be output on the second display 220.

Meanwhile, a different control may be performed according to whether or not a passenger is in the passenger seat, although the second display is moved.

In detail, in a state that the second display 220 is located at the passenger seat area (area B) and the rear seat area (area C), a diver cannot use the second display 220 during driving. Under this state, if any passenger is not sitting in the passenger seat and the rear seats, the second display 220 in a power-on state may unnecessarily waste power.

To solve this problem, the vehicle control device according to the present invention may further include a passenger sensor that detects whether or not a passenger has sit in at least one of the passenger seat and the rear seats. The controller may determine a presence or absence of a passenger based on information detected by the passenger sensor.

As illustrated in FIG. 6B, when the second display is located in the passenger seat area (area B) or the rear seat area (area C) while a passenger is in the passenger seat or the rear seat, the preset screen information is output on the second display.

On the other hand, as illustrated in FIG. 7A, when the second display 220 is located in the passenger seat area (area B) or the rear seat area (area C) in a state that any passenger except for a driver is not present, the controller turns off the second display 220.

Although not illustrated, when the second display is moved from the passenger seat area (area B) or the rear seat area (area C) to the center fascia area (area A), the controller 180 turns on the second display 220, and extends information currently output on the first display 210 up to the second display 220 for output.

Meanwhile, a plurality of graphic objects linked with control functions may be output on the first display. When a specific graphic object is output on an area adjacent to a right end of the first display, the driver is considerably difficult to apply a touch input to the specific graphic object during driving.

When the second display 220 is located in the passenger seat area (area B), the second display 220 is located at a position closer to the driver than the first display 210. By using this distance characteristic, the second display may operate as a user input unit with respect to information currently output on the first display.

In detail, when the second display 220 is moved to a preset position while outputting an execution screen of an application on the first and second displays 210 and 220 in a dividing manner, the controller 180 determines whether or not passengers are sitting in the passenger seat and the rear seats.

When no passenger is present, the controller 180 controls the second display 220 to be turned off.

In this instance, the second display 220 is turned off, but a touch sensor may be activated at a predetermined period to detect a touch applied to the second display 220.

Figure 7B:
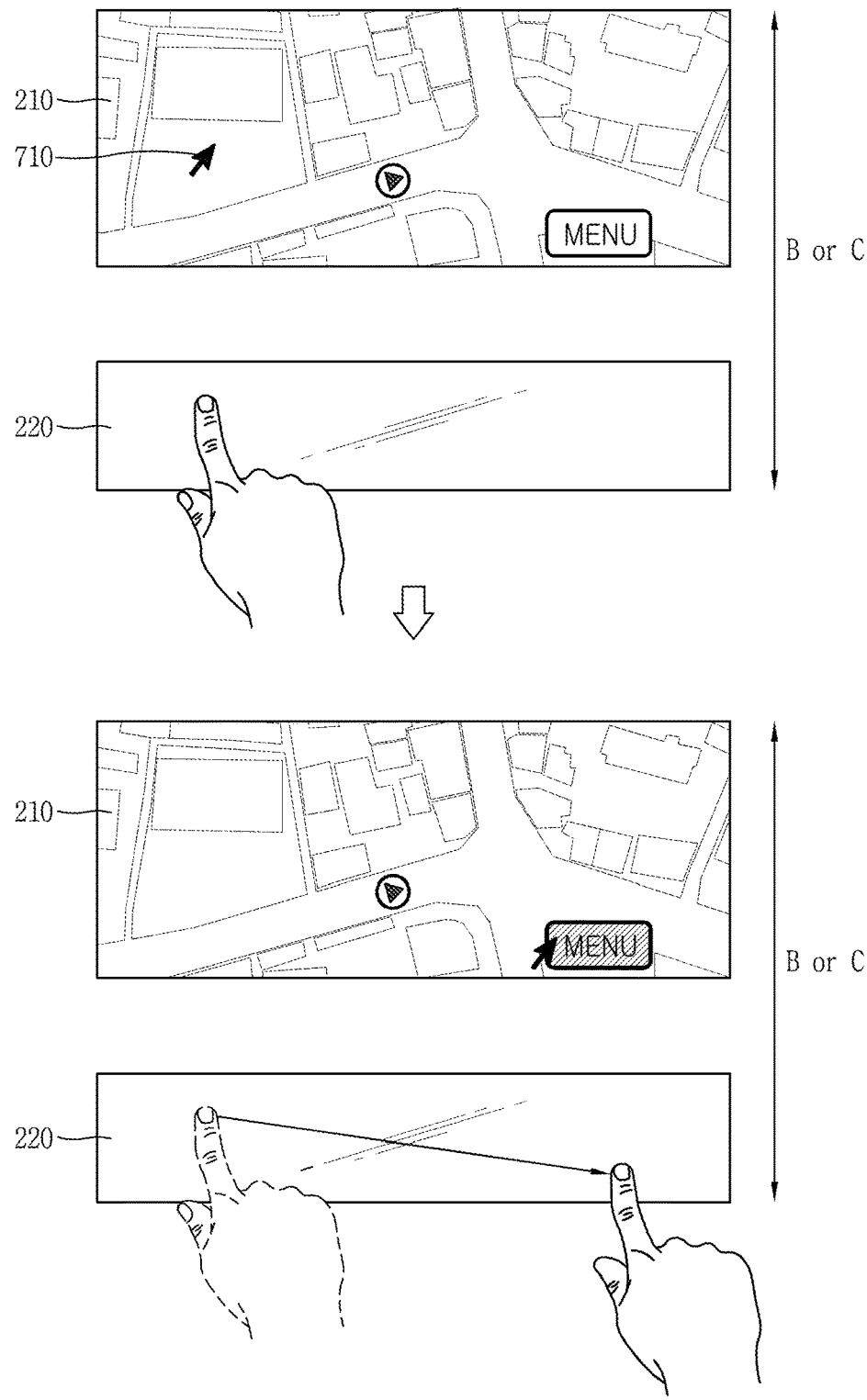

As illustrated in FIG. 7B, when a touch is applied to the second display 220 in the turn-off state, the controller 180 controls the first display 210 to output a cursor 710 corresponding to the touch applied to the second display 220.

The cursor 710 is moved along a movement of the touch. When a touch input such as a double tap or the like is applied to the second display 220, the same control as a touch input being applied to a graphic object output beneath the cursor may be executed.

When it is difficult to apply a touch to a graphic object currently output on the first display, the driver may move the second display to a predetermined position to which the driver can easily apply a touch input, and thus apply a touch input to the graphic object using the second display.

As another control, a currently-output execution screen of an application may differ according to the connection/separation of the first and second displays.

FIG. 8 is a view illustrating an embodiment in which an execution screen of one application differs according to a combination/separation of the first and second displays.

When the first and second displays 210 and 220 are in a connected state or spaced apart from each other by a predetermined distance or less, the controller 180 controls the first and second displays 210 and 220 to output a main execution screen of an application in a dividing manner.

On the other hand, when the spaced distance between the first and second displays 210 and 220 is greater than the predetermined distance, the controller 180 controls the first and second displays 210 and 220 to output a first sub execution screen of the application on the first display 210 and a second sub execution screen of the application on the second display 220.

For example, when a map application is executed, a map image of a predetermined region may be output as a main execution screen on the first and second displays 210 and 220 in a dividing manner while the first and second displays 210 and 220 are connected to each other. On the other hand, map images of regions smaller than the predetermined region may be output as sub screens on the first and second displays 210 and 220, respectively, in the separated state of the first and second displays 210 and 220. The driver may be provided with road guidance information using the map image output on the first display 210 and previously search for a remaining path (route) or search for surrounding information, such as favorite restaurants located nearby, using the map image output on the second display 220.

As another example, in the separated state of the first and second displays 210 and 220, a map image may be output on the first display 210 and a search word input screen including a virtual keypad may be output on the second display

220. A passenger may apply a touch to the virtual keypad to set/reset a destination or add a stopover.

Figure 9A:
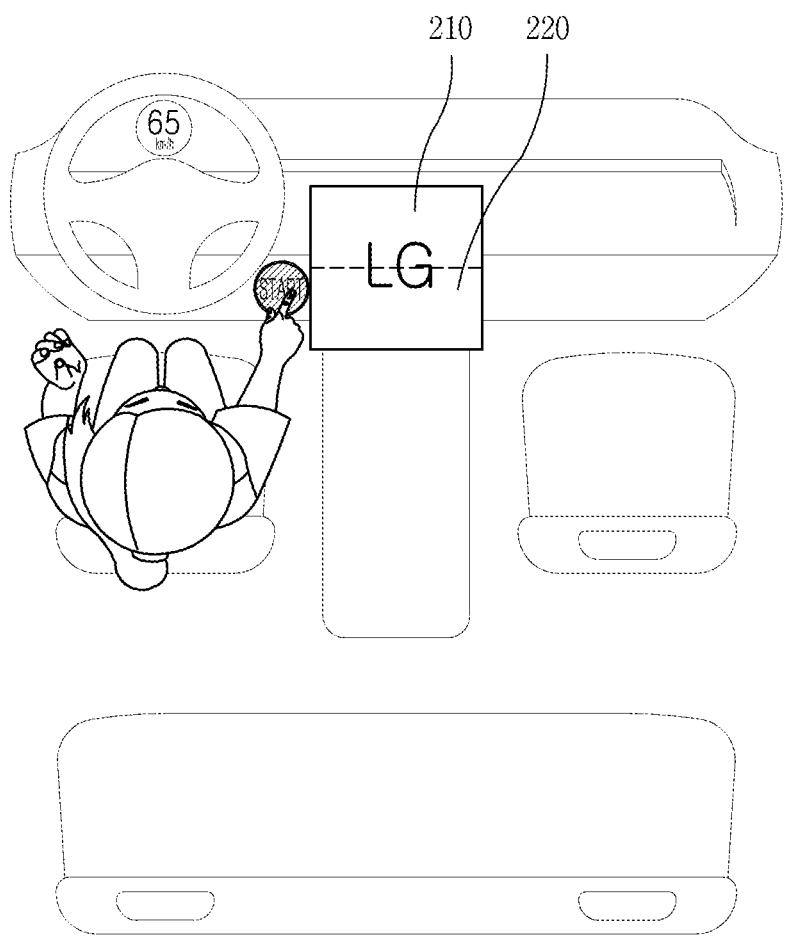
FIGS. 9A to 9C are views illustrating embodiments of performing different operations according to a position of a second display and a passenger when an engine of the vehicle is started up.
Figure 9B:
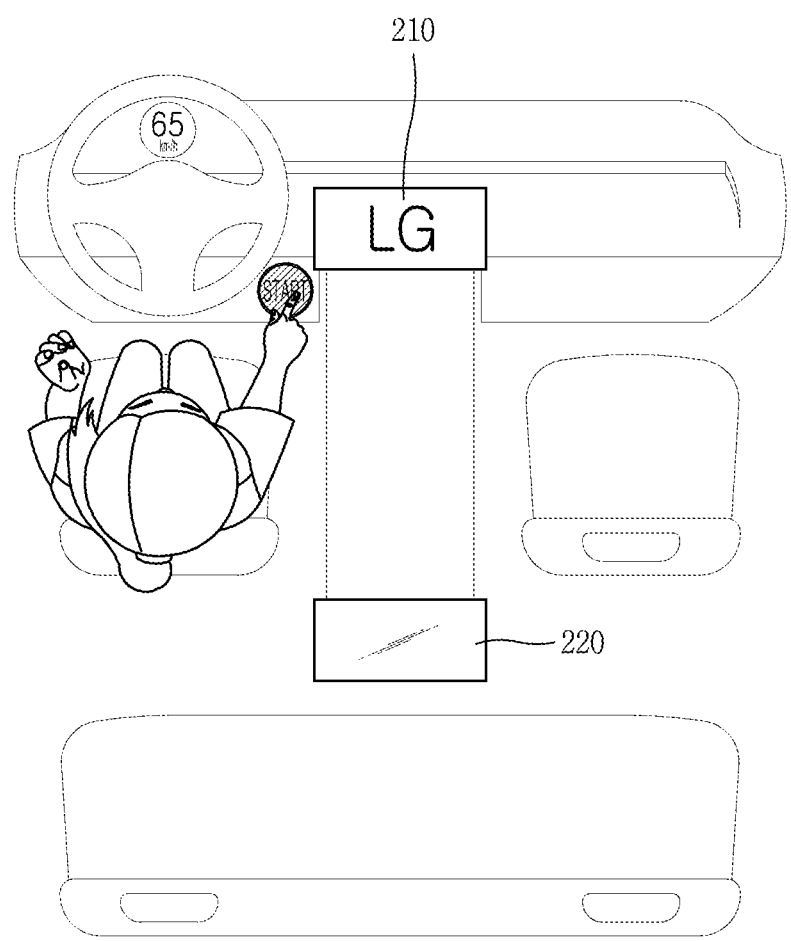
Figure 9C:
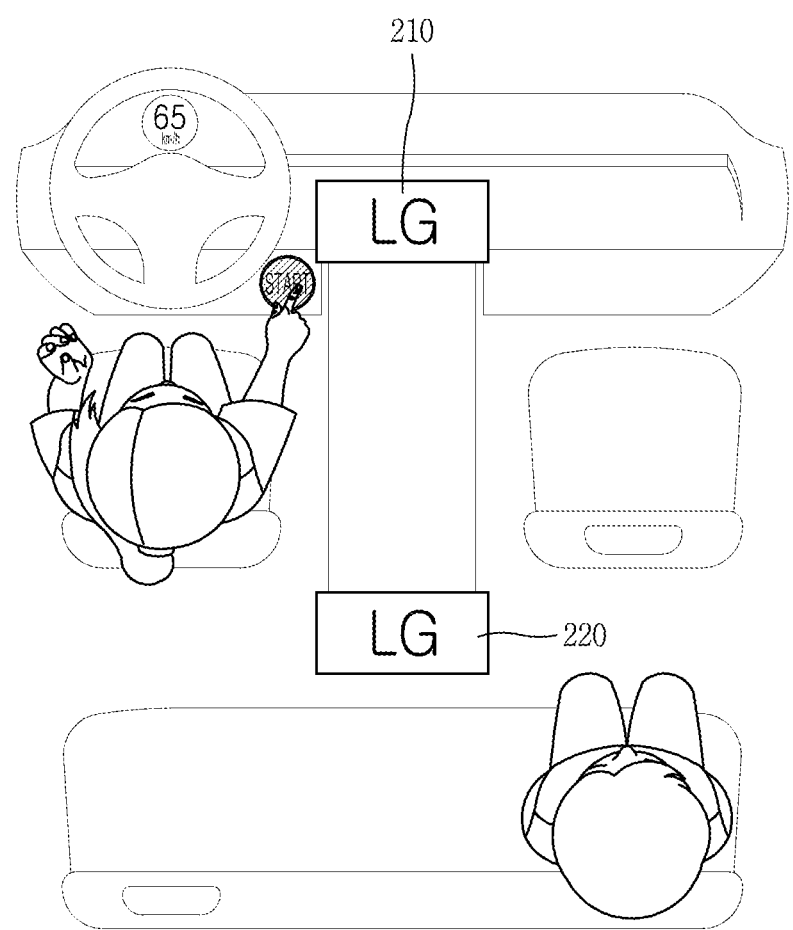

FIGS. 9A to 9C are views illustrating embodiments of performing different operations according to a position of the second display and a passenger when the vehicle is started up.

When the vehicle is started on, the controller 180 may differently control the first and second displays according to a position of the second display and a presence or absence of a passenger.

For example, as illustrated in FIG. 9A, the controller 180 turns on the first and second displays 210 and 220 when the first and second displays are in the contact state or spaced apart by the predetermined distance or less at the moment that the vehicle is started on.

On the other hand, as illustrated in FIG. 9B, the controller 180 turns on the first display 210 but maintains the turn-off state of the second display 220 when the spaced distance between the first and second displays is greater than the predetermined distance and any passenger is not sitting in the passenger seat and the rear seats at the moment that the vehicle is started on.

In addition, the controller 180 may control the second display 220 to be moved along the guide 230 such that the spaced distance is within the predetermined distance. In detail, the control device 100 for the vehicle may further include a moving member allowing the second display 220 to be moved along the guide 230. The controller 180 can control the second display 220 to be moved using the moving member. When the second display 220 is moved, the second display 220 may be powered on.

Meanwhile, as illustrated in FIG. 9C, the first and second displays 210 and 220 are simultaneously turned on when the spaced distance between the first and second displays 210 and 220 is greater than the predetermined distance and a passenger is sitting in at least one of the passenger seat and the rear seats at the moment that the vehicle is started on.

Since the turn-on/off of the second display is decided according to a presence or absence of a passenger and the position of the second display at the moment that the vehicle is started on, unnecessary power consumption can be prevented.

FIG. 10 is a view illustrating an operation when one of the first and second displays is out of order.

When a preset breakdown is caused in one of the first and second displays 210 and 220, the controller controls the one display from which the preset breakdown has occurred to be turned off, and another display to continuously output currently-output information such that the information output thereon cannot change according to the position of the second display. In other words, when one display is out of order, information output on another display does not change according to the position of the second display.

In addition, the control device 100 for the vehicle may further include a fixing member to fix the second display 220 to the guide 230 to prevent a movement of the second display 220. The controller 180 may fix the second display 220 to the guide 230 when the preset breakdown is caused in the one display.

When the display which is out of order is the first display 210, the controller 180 moves the second display 220 to be spaced apart from the first display 210 by the predetermined distance or less using the moving member. This is because the driver should be provided with driving information using the second display 220.

For example, as illustrated in FIG. 10, an execution screen of a first application may be output on the first display 210 and an execution screen of a second application may be output on the second display 220. In this instance, the execution screen of the first application may include road guidance information related to driving of the vehicle, and the execution screen of the second application may be a video reproduction screen.

Continuously, when a preset breakdown occurs in the first display 210, the controller 180 turns off the first display 210 and moves the second display 220 to the center fascia area (area A). The controller 180 also outputs the execution screen of the first application, other than the execution screen of the second application, on the second display 220 to continuously provide the road guidance information to the driver. In this instance, since the second display 220 is fixed to the guide 230 by the fixing member, the passenger can recognize the breakdown of the first display 210.

So far, the embodiments in which the display unit 151 includes the first and second displays and different types of information are provided according to the position of the second display while the first display is fixed has been explained.

Although not illustrated, the first display may also be movable like the second display, and different types of information may be output according to positions of the first and second displays.

For example, when the first and second displays are moved to the rear seat area (area C) while road guidance information is output on the first and second displays, the road guidance information may disappear from the first and second displays, and appear on a cluster or a wind shield by an HUD. In this instance, a rear seat home screen which can be used by a passenger in a rear seat may be output on the first and second displays.

Meanwhile, the display unit 151 may include more displays in addition to the first and second displays. Also, the guide 230 may guide at least one of the first and second displays to be moved in a direction from left to right sides of the vehicle as well as the direction from front to rear sides.

Figure 11A:
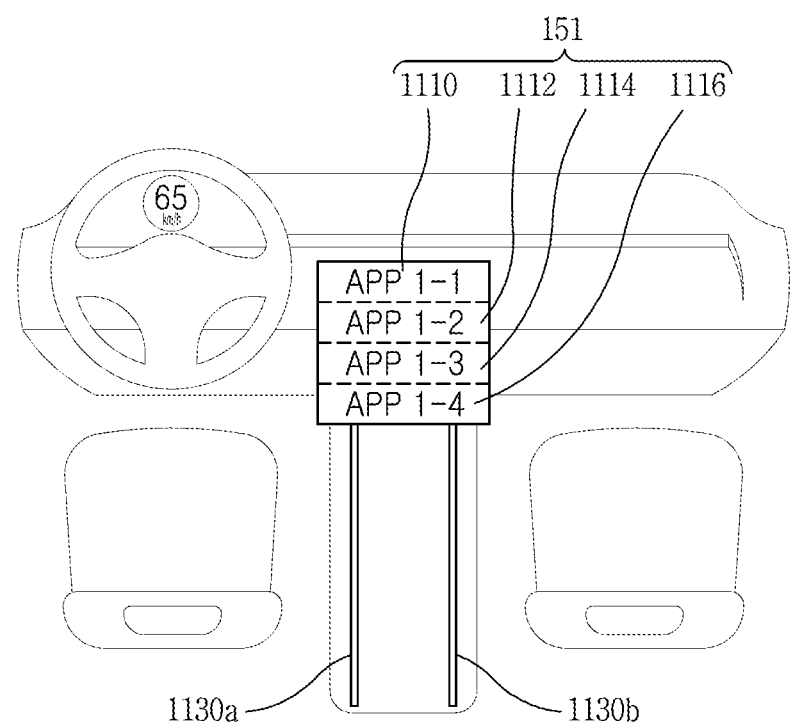
FIGS. 11A to 11C are views illustrating embodiments including at least three displays.
Figure 11B:
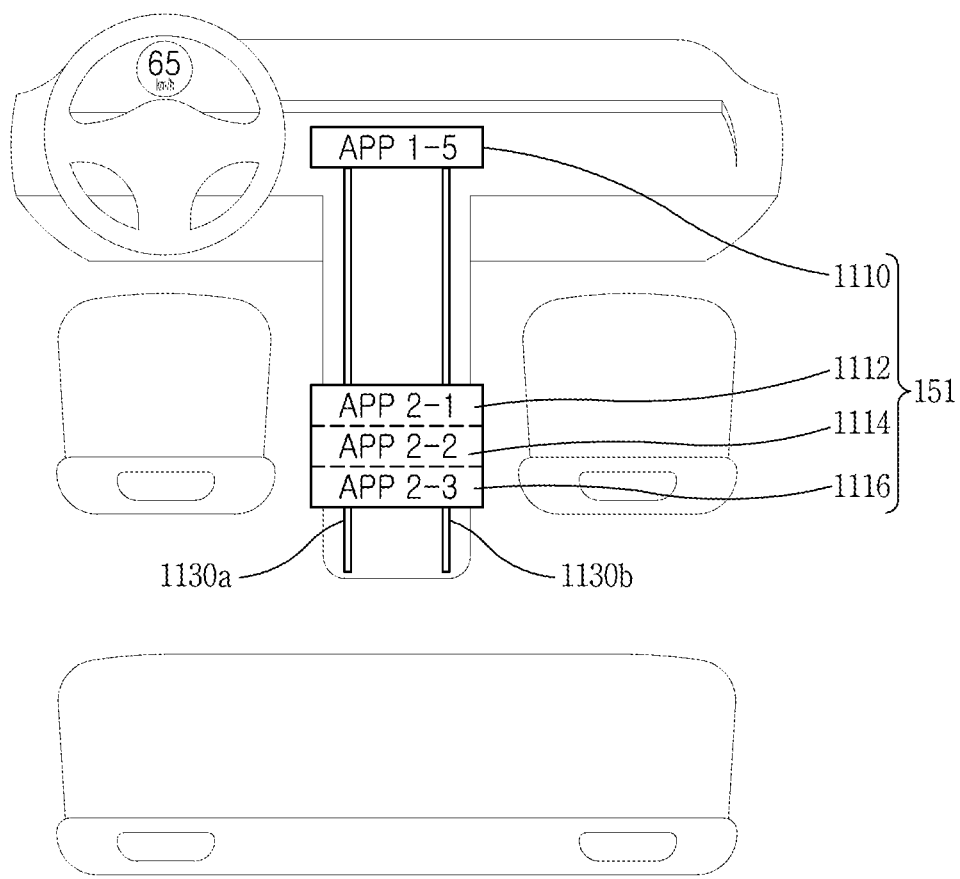
Figure 11C:
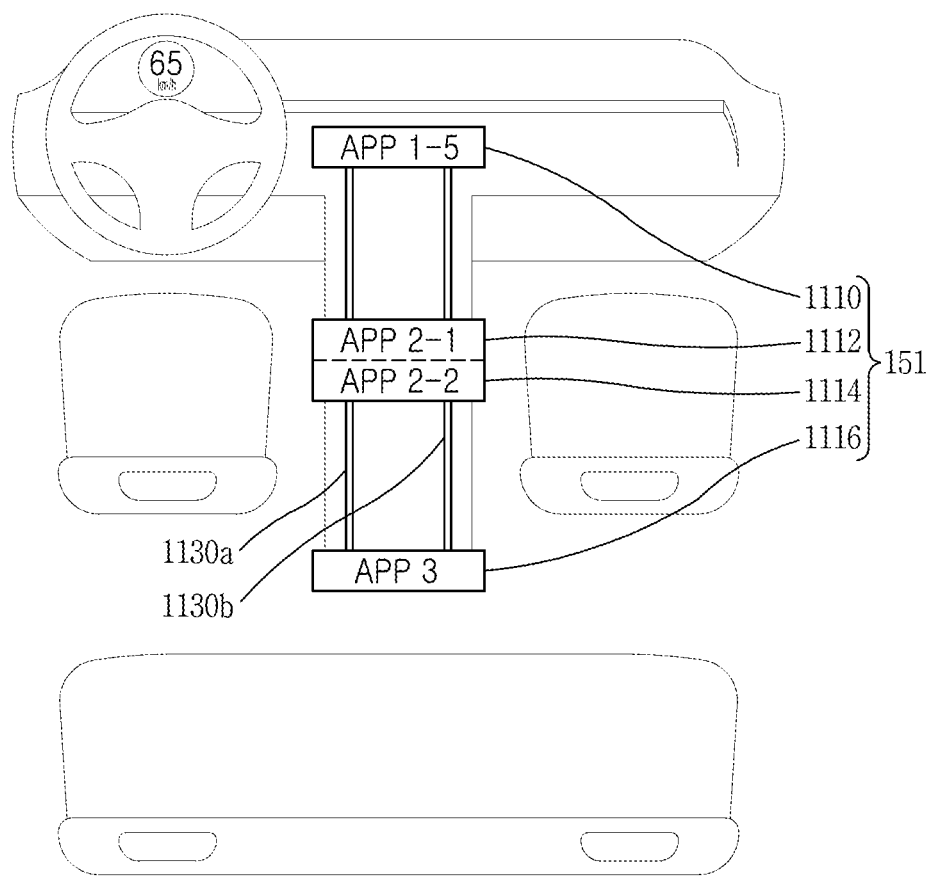
Figure 12A:
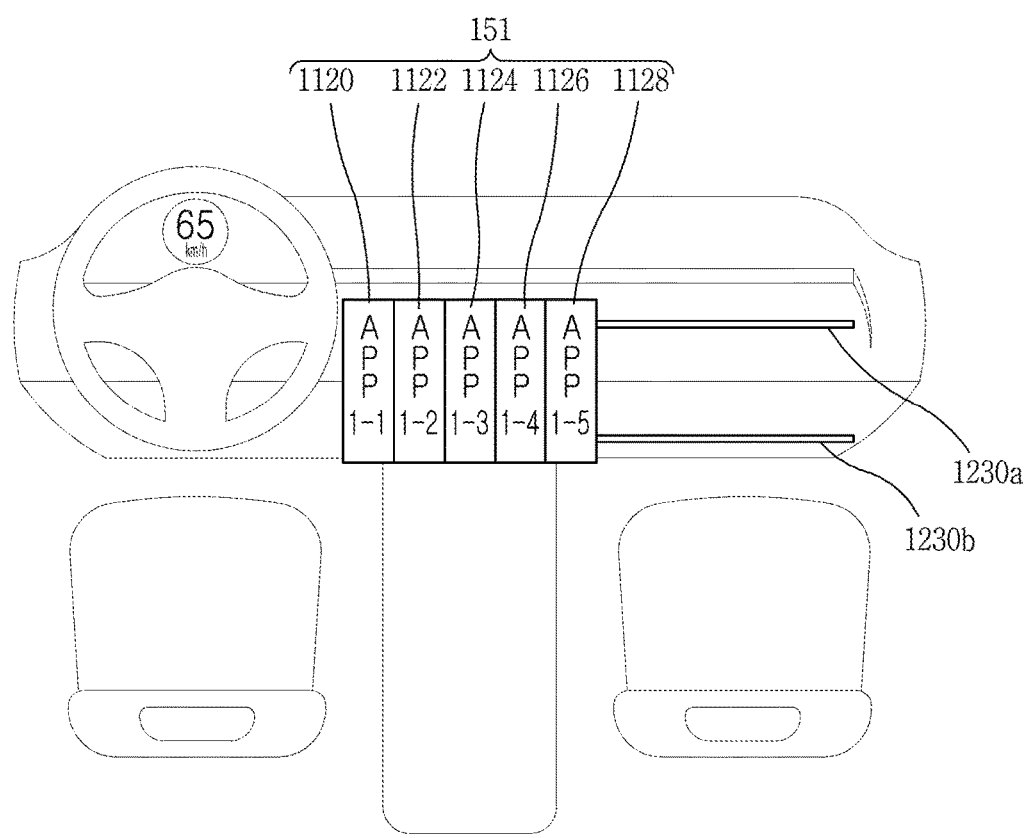
FIGS. 12A and 12B are views illustrating embodiments in which a moving direction differs according to a guide.
Figure 12B:
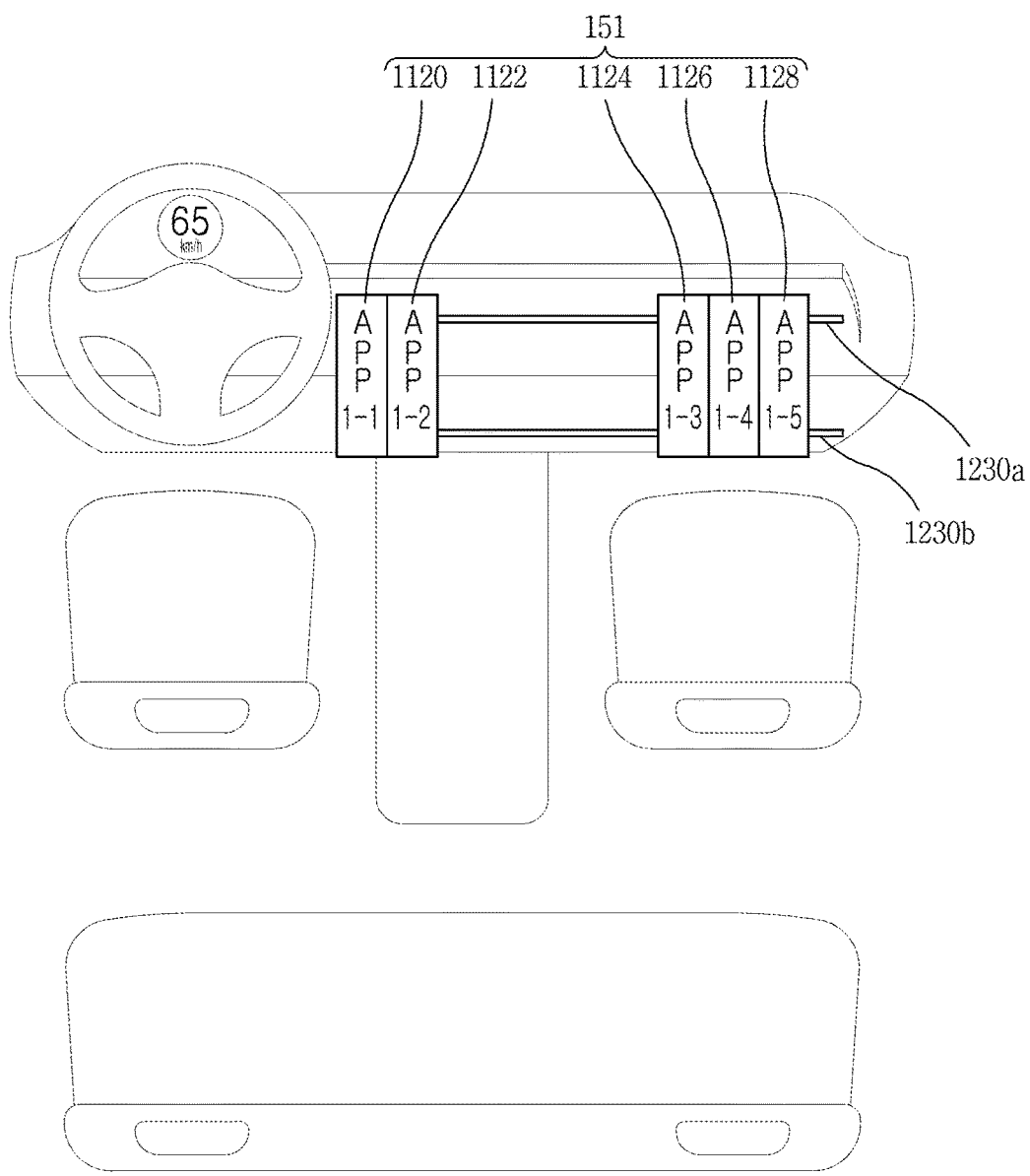

FIGS. 11A to 11C are views illustrating embodiments including at least three displays, and FIGS. 12A and 12B are views illustrating embodiments in which a moving direction differs according to a guide.

As illustrated in FIG. 11A, when first to fourth displays 1110, 1112, 1114 and 1116 included in the display unit 151 are connected together into one display area, the controller 180 may output an execution screen of an application on the one display area. First to fourth screens of a first application may be output on the first to fourth displays 1110, 1112, 1114 and 1116, respectively.

When at least one of the first to fourth displays 1110, 1112, 1114 and 1116 is moved along guides 1130a and 1130b, the controller 180 newly sets a display area based on the moved at least one display. According to a spaced state, first and second display areas may be set as illustrated in FIG. 11B, or first to third display areas may be set as illustrated in FIG. 11C.

When at least two display areas are set, the controller 180 may differently control information output on each display area on the basis of size and position of each display area.

For example, as illustrated in FIGS. 11A and 11B, when one display area is reset to two display areas, an execution screen of a first application is continuously output on the first display 1110 located in the center fascia area (area A). However, considering that the first display area is scaled down in a vertical direction, the controller may edit the execution screen for output, or selectively output one execution screen corresponding to the first display area among execution screens in various sizes, which are provided from the first application. Since the second display area is located within the passenger seat area (area B), a passenger seat home screen page may be output on the first to fourth displays 1110, 1112, 1114 and 1116 in a dividing manner.

Then, as illustrated in FIGS. 11B and 11C, when two display areas are reset to three display areas in response to a movement of at least one display, the execution screen of the first application may be output on the first display 1110 located in the center fascia area (area A), the passenger seat home screen page may be output on the second and third displays 1112 and 1114 located in the passenger seat area (area B), and a rear seat home screen page may be output on the fourth display 1116 located in the rear seat area (area C).

First to third display areas operate individually. Accordingly, an execution screen of a second application may be output on the second display area 1112 and 1114 and an execution screen of a third application may be output on the third display area 1116, in response to a user input.

Each of passengers sitting in the passenger seat and/or the rear seats, as well as the driver, can use a content that the passenger desires to use, in a manner of moving at least one display to his or her area according to the content desiring to use. When the driver gets on the vehicle alone, all of the displays may be connected to use a large screen. When the driver and passengers sitting in the seat next to the to driver and the rear seats are in the vehicle, the displays may be separated into at least two display areas for the driver and the passengers to use their desired contents, respectively, which may allow for efficiently using every display.

Meanwhile, as illustrated in FIGS. 12A and 12B, guides 1230*a* and 1230*b* according to one embodiment disclosed herein may allow at least one display to be moved in a direction from left to right sides of the vehicle (or a direction from right to left sides of the vehicle). In this instance, the guides 1230*a* 1230*b* are located on a dashboard of the vehicle, and at least part thereof extends in the direction from left to right sides of the vehicle.

Different types of information may be output according to in which of a center fascia area (area A') and a passenger seat area (area B') a plurality of displays 1120, 1122, 1124, 1126 and 1128 are located.

For example, as illustrated in FIG. 12A, when the plurality of displays 1120, 1122, 1124, 1126 and 1128 form one display area and are located in the center fascia area (area A'), the controller 180 controls the plurality of displays 1120, 1122, 1124, 1126 and 1128 to output information on the basis of the driver.

As another example, as illustrated in FIG. 12B, the plurality of displays 1120, 1122, 1124, 1126 and 1128 may form a first display area including the displays 1120 and 1122 located in the center fascia area (area A'), and a second display area including the displays 1124, 1126 and 1128 located in the passenger seat area (area B'). In this instance, the controller controls the first display area 1120, 1122 to output information based on the driver, and control the second display area 1124, 1126, 1128 to output information based on a passenger sitting in the seat next to the driver.

Those embodiments illustrated in FIGS. 4 to 11C may also be applied even to a case where guides allow at least one display to be moved from left to right sides of a vehicle (or right to left sides of the vehicle).

Explaining the display unit 151 again, the display unit 151 may be formed to output information even on side surfaces as well as a front surface of the center fascia area, which may result in implementing a display with a larger screen. That is, the present invention proposes the control device 100 for the vehicle having a front display and side displays, and provides new types of user interfaces using those displays. Hereinafter, the front display, the side displays and operations implemented by them will be described in more detail with reference to the accompanying drawings.

Figure 13:
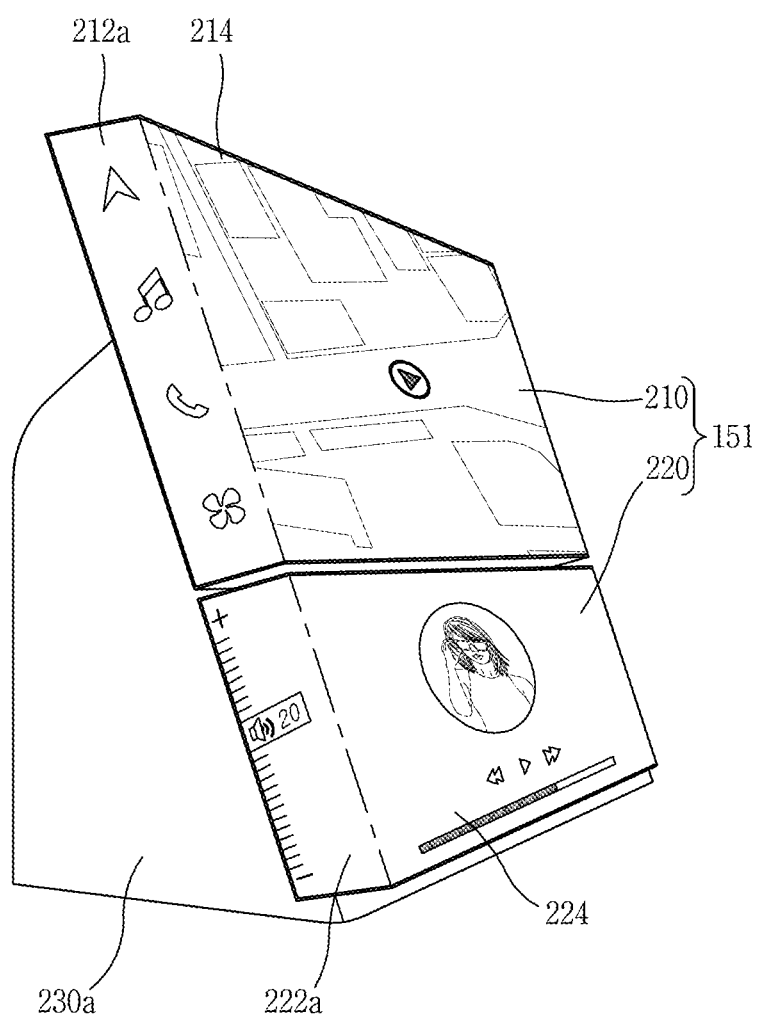
FIG. 13 is a view illustrating a bended display with at least part bent so as to face front and side surfaces.

FIG. 13 is a view illustrating a bended display with at least part bent to face front and side surfaces.

Referring to FIG. 13, the first display includes a first area 214 arranged on a front surface of the center fascia, and a second area 212 extending from the first area 214 and arranged on side surfaces of the center fascia. The first area 214 and the second area 212 are areas outputting different types of information from each other, and are divided by including different forms of user graphic interfaces (GUIs).

Also, the second area 212 includes a left area 212*a* and a right area 212*b* (see FIGS. 14A and 14B) arranged on left and right side surfaces of the center fascia, respectively. Therefore, the second area 212 has a symmetrical structure in a left and right direction on the basis of the first area 214.

The second display 220 also includes a first area 224 and a second area 222.

Referring to FIG. 13, an execution screen of a first application may be output on the first display 210, and an execution screen of a second application may be output on the second display 220.

The first and second displays 210 and 220 may be supported by guides and slidable along the guides.

FIGS. 14A to 15B are views illustrating operations of first and second bended display.

The display unit 151 is disposed on the front surface of the center fascia and outputs visual information. The display unit 151 according to the present invention has a form extending from the front surface of the center fascia up to other surfaces of the center fascia. In more detail, the display unit 151 includes a first area arranged on the front surface, and a second area extending from the first area and arranged on side surfaces of the center fascia.

For example, a window disposed on an upper surface of the display unit 151 may have both side surfaces bent, and accordingly, forms appearance of the front and side surfaces of the display unit 151. Therefore, the first area and the second area may be connected into a shape without a physical boundary surface. In this instance, the display unit 151 may include a display device which is formed in a bent shape and installed to correspond to the window.

As another example, the display unit 151 may be a flexible display unit. The flexible display unit includes a display which is a type of display that is deformable by an external force. This deformation may include any of curving, bending, folding, twisting, rolling, and combinations thereof. Here, the flexible display unit may include a general flexible display, electronic paper (also known as e-paper), and combinations thereof.

Here, the typical flexible display refers to a display which is generally formed as a lightweight, non-fragile display, which still exhibits characteristics of a conventional flat panel display, but is instead fabricated on a flexible substrate which can be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule. In this manner, a display with both side surfaces bent according to a characteristic of a flexible material can be configured.

The left area 212a of the first display 210 and the left area 222a of the second display 220 are disposed on the left side surface of the center fascia to face the driver. On the other hand, the right area 212b of the first display 210 and the right area 222b of the second display 220 are disposed on the right side surface of the center fascia to face the passenger sitting next to the driver.

The controller 180 may output icons included in a first group on the left areas 212a and 222a, and icons included in a second group on the right areas 212b and 222b.

The icons included in the first group are linked with control functions that the driver can use. For example, a vehicle door lock function, an autonomous driving mode on/off function, a cruise on/off function and the like may be included in the first group.

On the other hand, the icons included in the second group are linked with control functions that the passenger sitting in the seat next to the driver can use. For example, a passenger seat temperature adjustment function, a passenger seat volume adjustment function, a video reproduction function, a web browser and the like may be included in the second group.

Figure 14A:
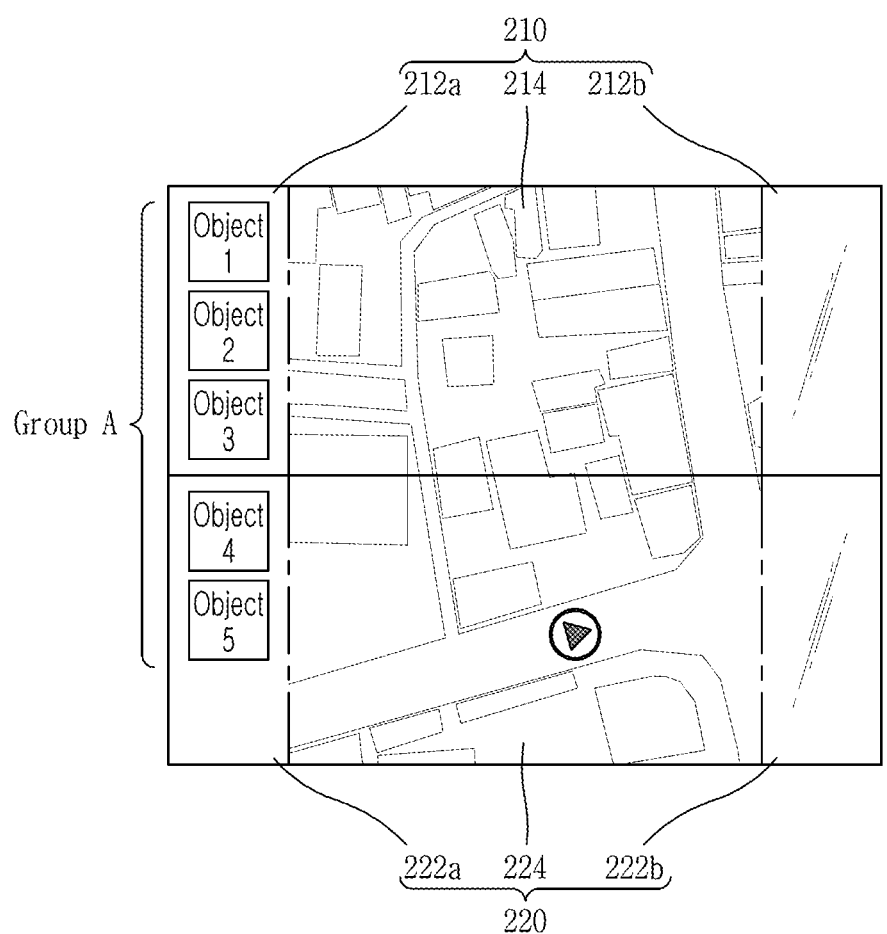
FIGS. 14A to 15B are views illustrating operations of first and second bended displays.
Figure 14B:
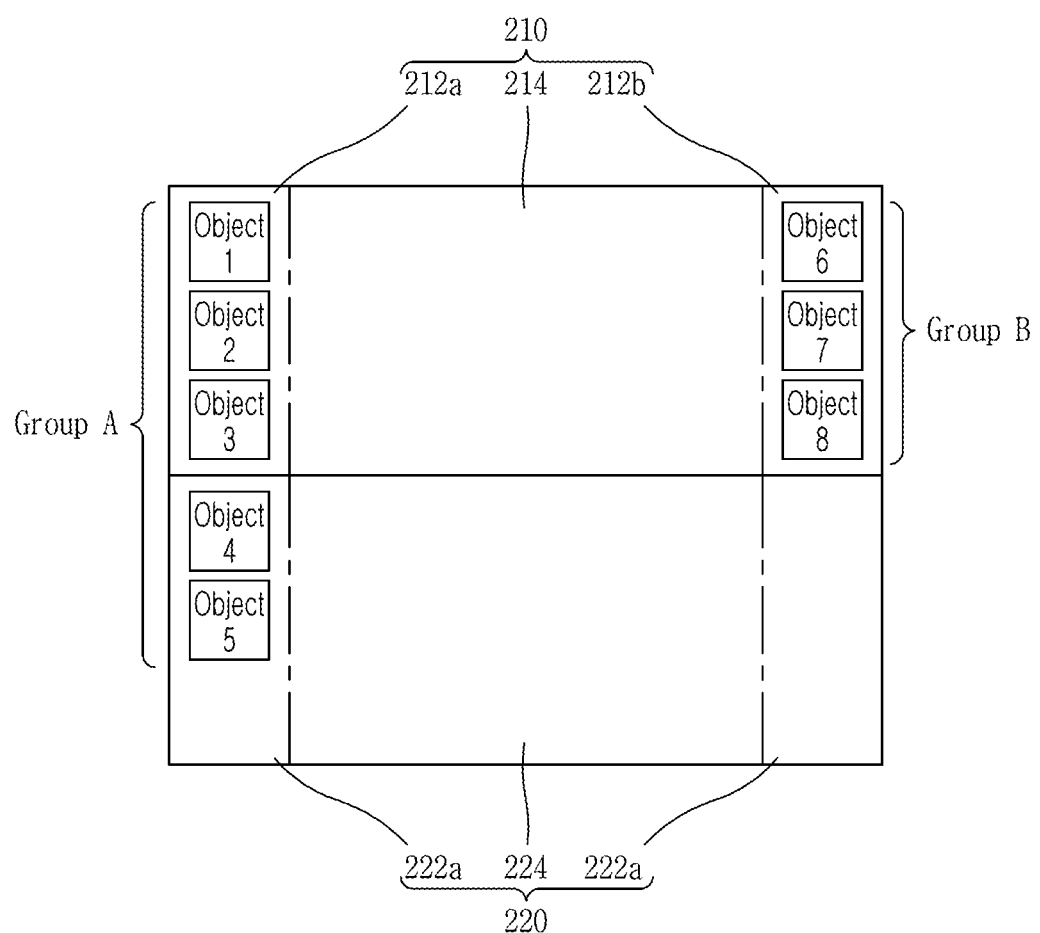

Meanwhile, when anyone is not sitting in the passenger seat, as illustrated in FIG. 14A, the controller 180 controls the first and second displays 210 and 220 not to output the icons included in the second group on the right areas 212b and 222b. When a person is sitting in the passenger seat, as illustrated in FIG. 14B, the controller controls the first and second displays to output the icons included in the second group on the right areas 212b and 222b.

As another example, the controller 180 may turn on/off the right areas 212b and 222b of the first and second displays 210 and 220 according to whether or not there is a passenger sitting in the passenger seat. In detail, the controller 180 turns on the right areas 212b and 222b when a person is sitting in the passenger seat, and turns off the right areas 212b and 222b when anyone is not sitting in the passenger seat. Accordingly, unnecessary power consumption can be prevented.

Figure 14C:
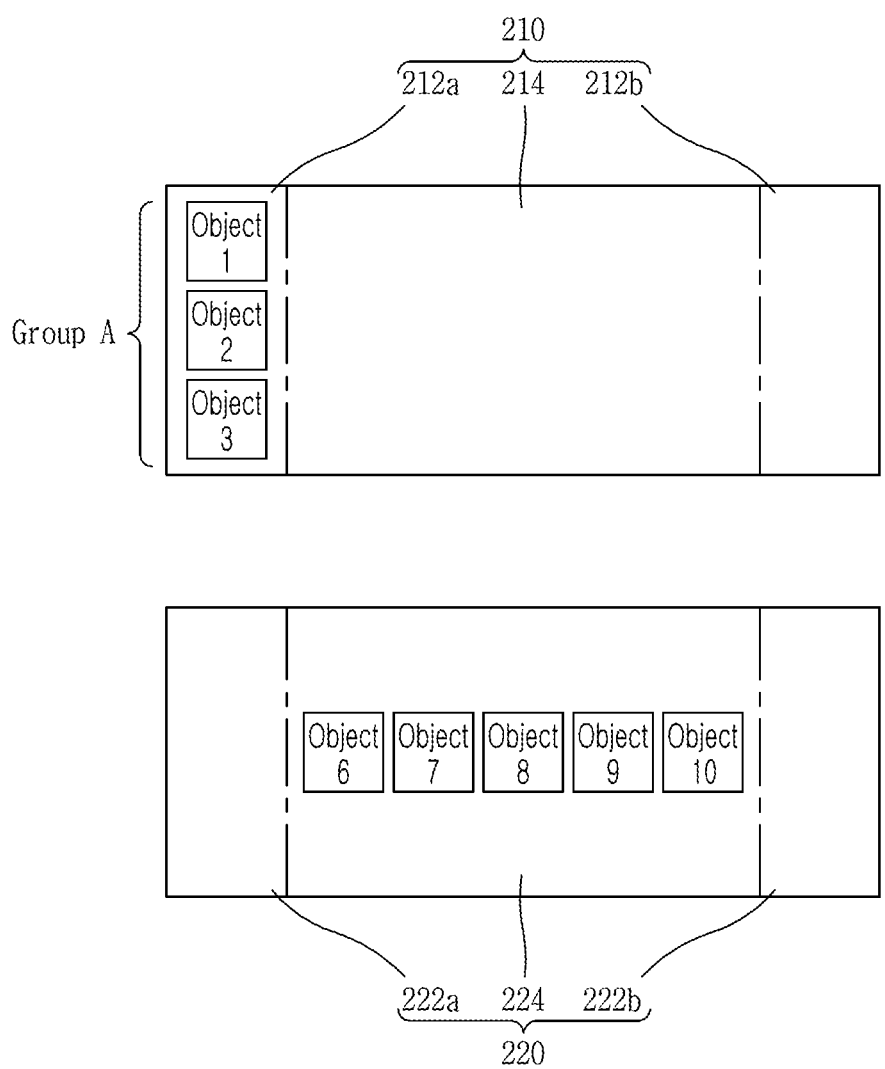

Meanwhile, as illustrated in FIG. 14C, when the first display 210 is located in the center fascia area (area A) and the second display 220 is located in the passenger seat area (area B), information output on the first and second displays 210 and 220 may differ.

Since the first display 210 is located in the center fascia area (area A), the driver and the person sitting in the passenger seat can use the first display 210 together. On the other hand, since the second display 220 is located at the passenger seat area (area B), the driver cannot use the second display 220 but only the passenger sitting in the seat next to the driver can use the second display 220.

Considering this matter, the controller may output an icon (Object 1) of a control function, which can be used by both of the driver and the passenger sitting in the seat next to the driver, on the right area 212b of the first display 210. When a touch is applied to the icon (Object 1) output on the right area 212b, screen information corresponding to the control function of the icon (Object 1) may be output on the first area 214 of the first display 210.

The controller 180 does not output the icons included in the first group on the left area 222a of the second display 220 because the driver cannot use the left area 222a of the second display 220. A passenger seat home screen page may be output on the first area 224 of the second display 220 and the icons, which are included in the second group and can be used by the passenger sitting in the seat next to the driver, may be output on the right area 222b of the second display 220.

Meanwhile, the controller may perform communication with a terminal located within the vehicle, and execute functions associated with the terminal. In detail, when specific information is received in the terminal located within the vehicle, the currently-received specific information may be output on the display unit. The specific information may include a message, an email, a call, a schedule notification and the like.

Figure 15A:
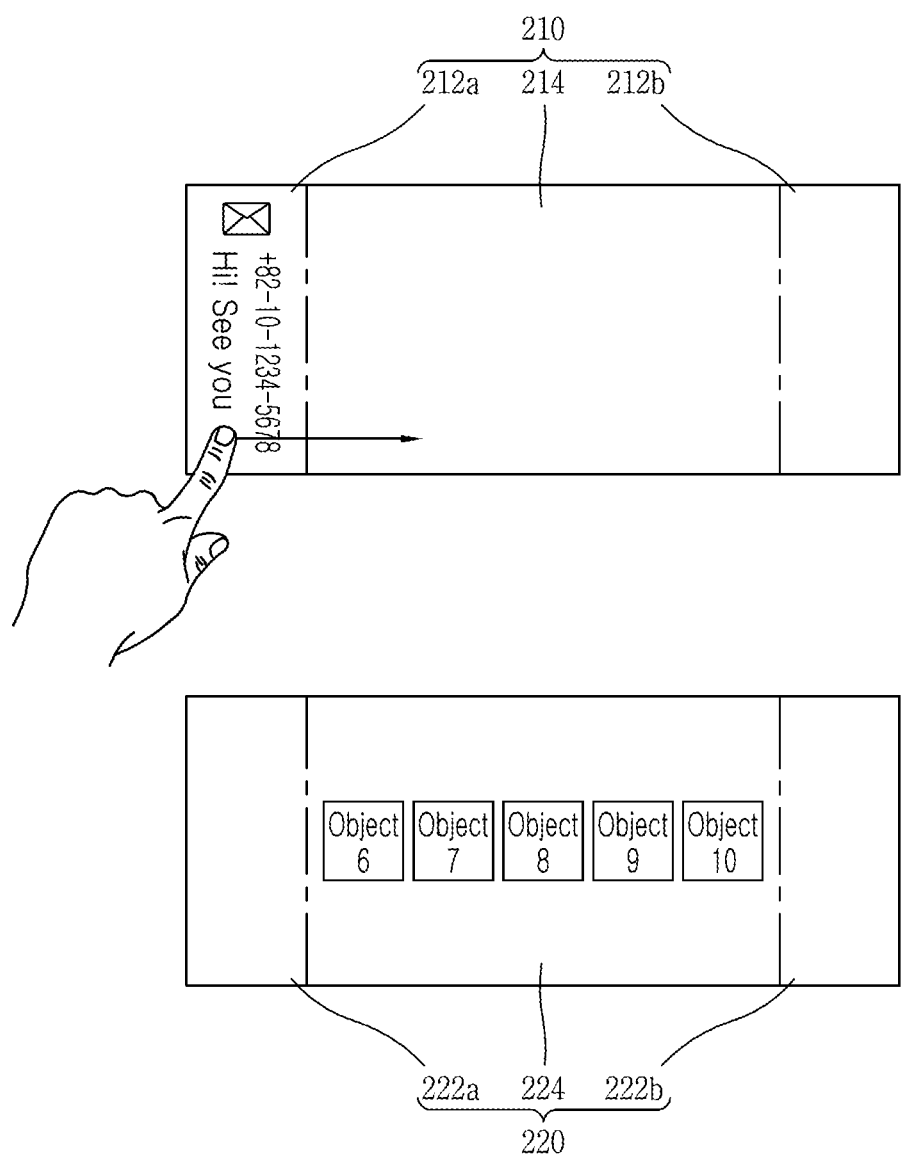

When specific information is received in a first terminal which is located at a driver seat, as illustrated in FIG. 15A, the controller 180 may control the first display 210 to output first guide information for guiding the received specific information on the left area 212a. For example, when the received specific information is a call, the first guide information may include information related to an originated terminal. As another example, when the specific information is a message, the first guide information may include information related to an oriented terminal, a message-transmitted time, and details of the message.

Although not illustrated, when specific information is received in a second terminal located at a passenger seat, the controller 180 controls the first display 210 to output second guide information for guiding the received specific information on the right area 212b.

Meanwhile, as illustrated in FIGS. 15A and 15B, while the first guide information is output on the left area 212a of the first display 210, a touch input which moves from the left area 212a of the first display 210 to the first area 214 may be input. In response to the touch input, the controller 180 controls the first display 210 to output the first guide information on the right area 212b of the first display 210, instead of the left area 212a. Simultaneously, the controller 180 may output a message input window to write a response message to the first guide information on the second display 220. The message input window may include a virtual keypad, and a window for displaying an input message.

Meanwhile, although the first area of the first display faces a first direction and the right area faces a second direction, the driver can check information output on each of the first area and the left area. Since the first area is greater than the second area in size, the controller may control the display to output a main screen with a great amount of information to output, such as road guidance information, on the first area, and a sub screen with a less amount of information to output, such as an icon, on the second area.

The display is fixed to the center fascia of the vehicle, which may cause the driver to fail to check information output on at least one of the first area and the left area according to a position of the sun. This is because light emitted from the sun and reaching the display interferes with visual information output on the display.

To solve this problem, the control device for the vehicle according to the present invention may further include a sensor for detecting a position of a light source. The controller may control the display to switch an output position of the sub screen output on the left area with an output position of the main screen output on the first area according to the position of the light source sensed by the sensor.

When the output positions are switched with each other, the controller may edit at least one of the main screen and the sub screen by considering a screen ratio of the left area and a screen ratio of the first area. For example, when road guidance information which was being output on the first area is output on the left area due to the position of the light source, the method of outputting the road guidance information may differ according to the screen ratio of the left area.

This may allow the driver to keep using the main screen through different areas of a display which face different directions.

FIG. 16 is a view illustrating a bendable display with at least part bendable by external force.

First and second displays according to the present invention may be configured to be bent by external force.

When at least part of the first display is bent toward a left side surface by external force, the controller controls the first display to output icons included in a first group on the at least part facing the left side surface. When at least part of the first display is bent toward a right side surface by external force, the controller controls the first display to output icons included in a second group on the at least part facing the right side surface.

In addition, the controller differently controls a number of output icons by considering a size of the left side surface and/or a size of the right side surface which are bent by external force. This may allow the driver or a passenger sitting in the seat next to the driver to apply external force to at least part of the display toward a side surface according to preference.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the control device for the vehicle. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A device for a vehicle, the device comprising:
a first display located in a first position inside the vehicle;
a second display that is moveable between a second position inside the vehicle and a third position inside the vehicle;
a guide that is located inside the vehicle and that is configured to move the second display between the second position and the third position; and
a controller configured to:
identify a current position of the second display,
determine, based on the current position of the second display, first information that is displayed on the first display and second information that is displayed on the second display,
provide the first information to the first display and the second information to the second display,
determine, based on the current position of the second display, a distance between the first display and the second display,
determine, based on the distance between the first display and the second display, a first group of icons from multiple groups of icons, and
provide the first group of icons to the first display or the second display,
wherein the multiple groups of icons include (i) a second group of icons that is associated with second components located near the second position inside the vehicle and (ii) a third group of icons that is associated with third components located near the third position inside the vehicle, and
wherein the controller is configured to control the second components in response to user input received by the second group of icons and the third components in response to user input received by the third group of icons.

2. The device of claim 1, wherein the controller is configured to:
determine, based on the distance between the first display and the second display, the first information that is displayed on the first display and the second information that is displayed on the second display, and
provide the first information to the first display and the second information to the second display.

3. The device of claim 2, wherein the first information and the second information include visual data for an application and visual data for a home screen.

4. The device of claim 3, wherein the visual data for the home screen includes a plurality of icons, and
wherein the controller is configured to:
receive user selections of a first icon and a second icon from the plurality of icons,
launch a first application corresponding to the first icon and a second application corresponding to the second icon, and
provide first visual data for the first application to the first display and second visual data for the second application to the second display.

5. The device of claim 4, wherein the controller is configured to:
update the current position of the second display,
update, based on the updated current position of the second display, the distance between the first display and the second display, and
change, based on the updated distance between the first display and the second display, the first information that is displayed on the first display and the second information that is displayed on the second display.

6. The device of claim 2, wherein the controller is configured to:
receive touch input from a user at the second display, and
provide an indicator on the first display, wherein the indicator moves following the touch input at the second display.

7. The device of claim 1, wherein the controller is configured to:
update the current position of the second display,
update, based on the updated current position of the second display, a distance between the first display and the second display, and
change, based on the updated distance between the first display and the second display, the first information that is displayed on the first display and the second information that is displayed on the second display.

8. The device of claim 1, wherein the controller is configured to:
receive a user selection of an application, launch the application, determine, based on the current position of the second display, a distance between the first display and the second display, provide, based on the distance between the first display and the second display, first visual data for the application to the first display and second visual data for the application to the second display.

9. The device of claim 1, wherein the first display is a curved display including a first surface and a second surface, and wherein the controller is configured to provide first visual data to be displayed on the first surface and second visual data to be displayed on the second surface.

10. The device of claim 9, wherein the controller is configured to:

determine whether a passenger is located inside the vehicle, and stop, based on the determination that a passenger is located inside the vehicle, provision of the second visual data on the second surface.

11. The device of claim 9, further comprising a sensor configured to detect light, wherein the controller is configured to:

obtain light information from the sensor, and change, based on the light information, the first visual data to be displayed on the first surface and the second visual data to be displayed on the second surface.

12. The device of claim 1, wherein the first display is a foldable display that includes a main surface based on the foldable display being folded in a first state and includes a first surface and a second surface based on the foldable display being folded in a second state, and wherein the controller is configured to provide first visual data to be displayed on the first surface and second visual data to be displayed on the second surface.

13. The device of claim 1, wherein the controller is configured to:

receive user input on the second display, and stop, based on the user input, provision of the second information to the second display.

14. The device of claim 1, wherein the controller is configured to:

determine working conditions of the first display and the second display, and disable, based on the working conditions of the first display and the second display, the first display or the second display.

15. The device of claim 14, further comprising a fixing member configured to fix the second display to the guide.

16. The device of claim 1, further comprising a sensor that is coupled to the guide and that is configured to detect the current position of the second display.

17. The device of claim 1, wherein the second position is a position near a front side of the vehicle and the third position is a position near a rear side of the vehicle.

18. A device for a vehicle, the device comprising:

a first display located in a first position inside the vehicle;

a second display that is moveable between a second position inside the vehicle and a third position inside the vehicle;

a guide that is located inside the vehicle and that is configured to move the second display between the second position and the third position; and a controller configured to:

identify a current position of the second display, determine, based on the current position of the second display, first information that is displayed on the first display and second information that is displayed on the second display, provide the first information to the first display and the second information to the second display, determine, based on the current position of the second display, a distance between the first display and the second display, determine, based on the distance between the first display and the second display, a first group of icons from multiple groups of icons, and provide the first group of icons to the first display or the second display, wherein the first display is a curved display including a first surface and a second surface, wherein the controller is configured to provide first visual data to be displayed on the first surface and second visual data to be displayed on the second surface, and wherein the controller is configured to:

identify a call that is received by a first terminal or a second terminal, determine whether the call is received by the first terminal or the second terminal, and provide, based on the determination that the call is received by the first terminal or the second terminal, information associated with the call to the first surface or the second surface.

* * * * *